(12) United States Patent
Nagata

(10) Patent No.: US 12,513,246 B2
(45) Date of Patent: Dec. 30, 2025

(54) SPEECH REPRODUCTION CONTROL SYSTEM, SPEECH REPRODUCTION CONTROL METHOD AND NON-TRANSITORY COMPUTER-READABLE RECORDING MEDIUM ENCODED WITH SPEECH REPRODUCTION CONTROL PROGRAM

(71) Applicant: KONICA MINOLTA, INC., Tokyo (JP)

(72) Inventor: Akihiro Nagata, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 321 days.

(21) Appl. No.: 18/376,770

(22) Filed: Oct. 4, 2023

(65) Prior Publication Data

US 2024/0163374 A1 May 16, 2024

(30) Foreign Application Priority Data

Nov. 16, 2022 (JP) ................................. 2022-183671

(51) Int. Cl.
*H04M 3/56* (2006.01)
*G10L 13/04* (2013.01)
*G10L 15/26* (2006.01)
*G10L 21/034* (2013.01)

(52) U.S. Cl.
CPC ............ *H04M 3/568* (2013.01); *G10L 13/04* (2013.01); *G10L 15/26* (2013.01); *G10L 21/034* (2013.01); *H04M 2201/38* (2013.01); *H04M 2203/5063* (2013.01)

(58) Field of Classification Search
CPC ............ H04M 3/568; H04M 2201/38; H04M 2203/5063; G10L 13/04; G10L 15/26
USPC ............ 379/203.01, 202.01, 201.01, 201.02
See application file for complete search history.

(56) References Cited

U.S. PATENT DOCUMENTS

| 4,975,957 | A | * | 12/1990 | Ichikawa | ............ | G10L 19/0018 |
| | | | | | | 704/E19.017 |
| 2005/0080626 | A1* | | 4/2005 | Marumoto | .............. | G10L 13/02 |
| | | | | | | 704/E13.002 |

FOREIGN PATENT DOCUMENTS

| JP | 2001-292429 A | 10/2001 |
| JP | 2021-184189 A | 12/2021 |

* cited by examiner

*Primary Examiner* — Thjuan K Addy
(74) *Attorney, Agent, or Firm* — Squire Patton Boggs (US) LLP

(57) ABSTRACT

A speech reproduction control system includes a speech reproducer that reproduces speech data in speech, a character reproducer that converts the speech data into characters for reproduction, and a hardware processor that reproduces first speech data and second speech data in parallel, wherein the hardware processor reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

20 Claims, 16 Drawing Sheets

F I G. 1 9
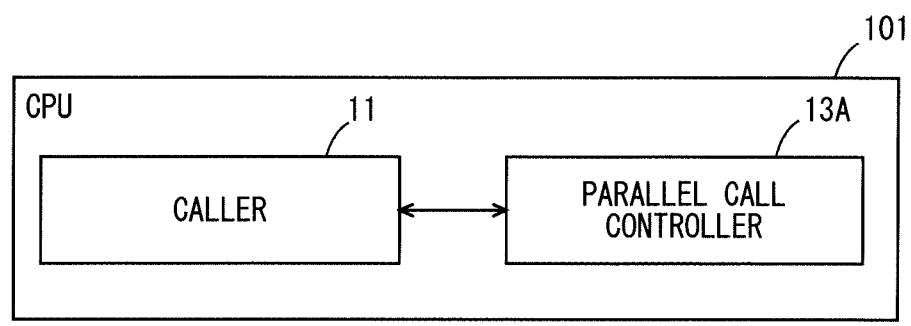

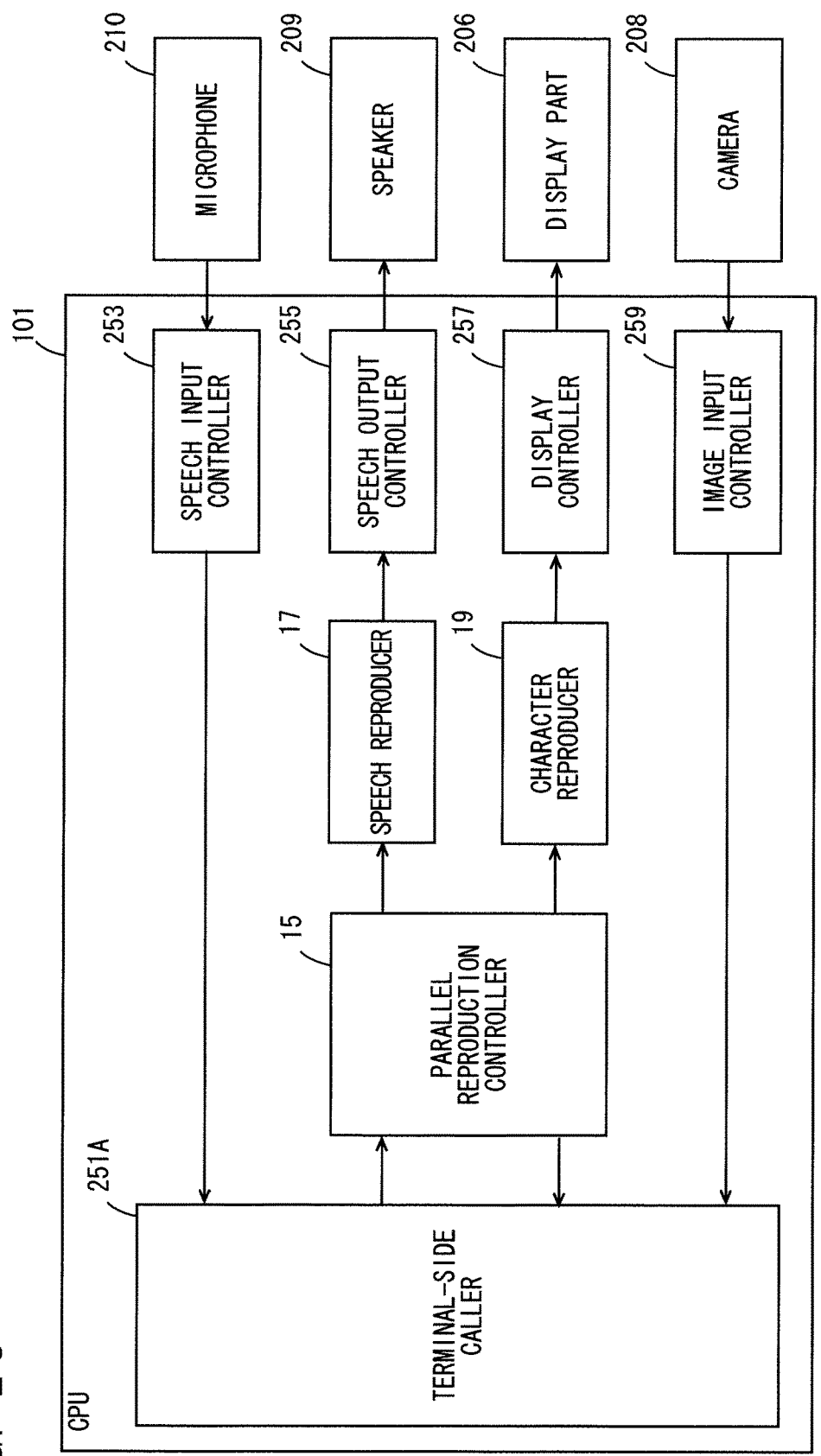
F I G. 20

SPEECH REPRODUCTION CONTROL SYSTEM, SPEECH REPRODUCTION CONTROL METHOD AND NON-TRANSITORY COMPUTER-READABLE RECORDING MEDIUM ENCODED WITH SPEECH REPRODUCTION CONTROL PROGRAM

CROSS-REFERENCE TO RELATED APPLICATIONS

The entire disclosure of Japanese patent Application No. 2022-183671 filed on Nov. 16, 2022 is incorporated herein by reference in its entirety.

BACKGROUND

Technological Field

The present invention relates to a speech reproduction control system, a speech reproduction control method and a non-transitory computer-readable recording medium encoded with a speech reproduction control program. In particular, the present invention relates to a speech reproduction control system which is suitable for reproducing a plurality of types of speeches, a speech reproduction control method which is executed by the speech reproduction control system and a non-transitory computer-readable recording medium encoded with a speech reproduction control program which causes a computer to execute the speech reproduction control method.

Description of the Related Art

In recent years, a speech call system with which a plurality of users located in places distant from one another have a call such as a conference call via computers has widespread. For example, Japanese Unexamined Patent Publication No. 2021-184189 discloses an on-line conference system that is connected to a plurality of terminals via a network and realizes an online conference among the terminals, wherein the on-line conference system has a distribution controller that causes speech data and image data to be distributed among the plurality of terminals, and the distribution controller, in a case in which any one of the terminals designates part of the plurality of terminals including the one terminal as specific terminals and a limited conversation instruction for having a conversation only among the specific terminals is received, performs limited distribution that prohibits distribution with speech data received among the specific terminals being reproducible in the other terminals.

However, in the on-line conference system described in Japanese Unexamined Patent Publication No. 2021-184189, a participant who has provided an instruction for limited conversation must listen to conversation in the on-line conference in speech, and must identify in speech whether conversation is conversation of limited conversation or conversation of the on-line conference. Therefore, in a case in which it is difficult for the participant who has provided the instruction for limited conversation to identify a speech, it may be difficult to distinguish conversation of limited conversation from conversation of the on-line conference.

SUMMARY

According to one aspect of the present invention, a speech reproduction control system includes a speech reproducer that reproduces speech data in speech, a character reproducer that converts the speech data into characters for reproduction, and a hardware processor that reproduces first speech data and second speech data in parallel, wherein the hardware processor reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

According to another aspect of the present invention, a speech reproduction control method includes causing a speech reproduction control device to execute a speech reproducing step of reproducing speech data in speech, a character reproducing step of converting the speech data into characters for reproduction, and a parallel reproduction controlling step of reproducing first speech data and second speech data in parallel, wherein the parallel reproduction controlling step includes causing the first speech data to be reproduced in the character reproducing step, causing the first speech data not to be reproduced in the speech reproducing step or to be reproduced at a volume lower than a volume for reproduction of the second speech data, and causing the second speech data to be reproduced in the speech reproducing step.

According to yet another aspect of the present invention, a non-transitory computer-readable recording medium is encoded with a speech reproduction control program that causes a computer to execute a speech reproducing step of reproducing speech data in speech, a character reproducing step of converting the speech data into characters for reproduction, and a parallel reproduction controlling step of reproducing first speech data and second speech data in parallel, wherein the parallel reproduction controlling step includes reproducing the first speech data in the character reproducing step, not reproducing the first speech data in the speech reproducing step or reproducing the first speech data at a volume lower than a volume for reproduction of the second speech data, and reproducing the second speech data in the speech reproducing step.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 19 is a diagram showing one example of the functions of a CPU included in a server in a modification example; and FIG. 20 is a diagram showing one example of the functions of a CPU included in a PC in the modification example.

DETAILED DESCRIPTION OF EMBODIMENTS

Figure 1:
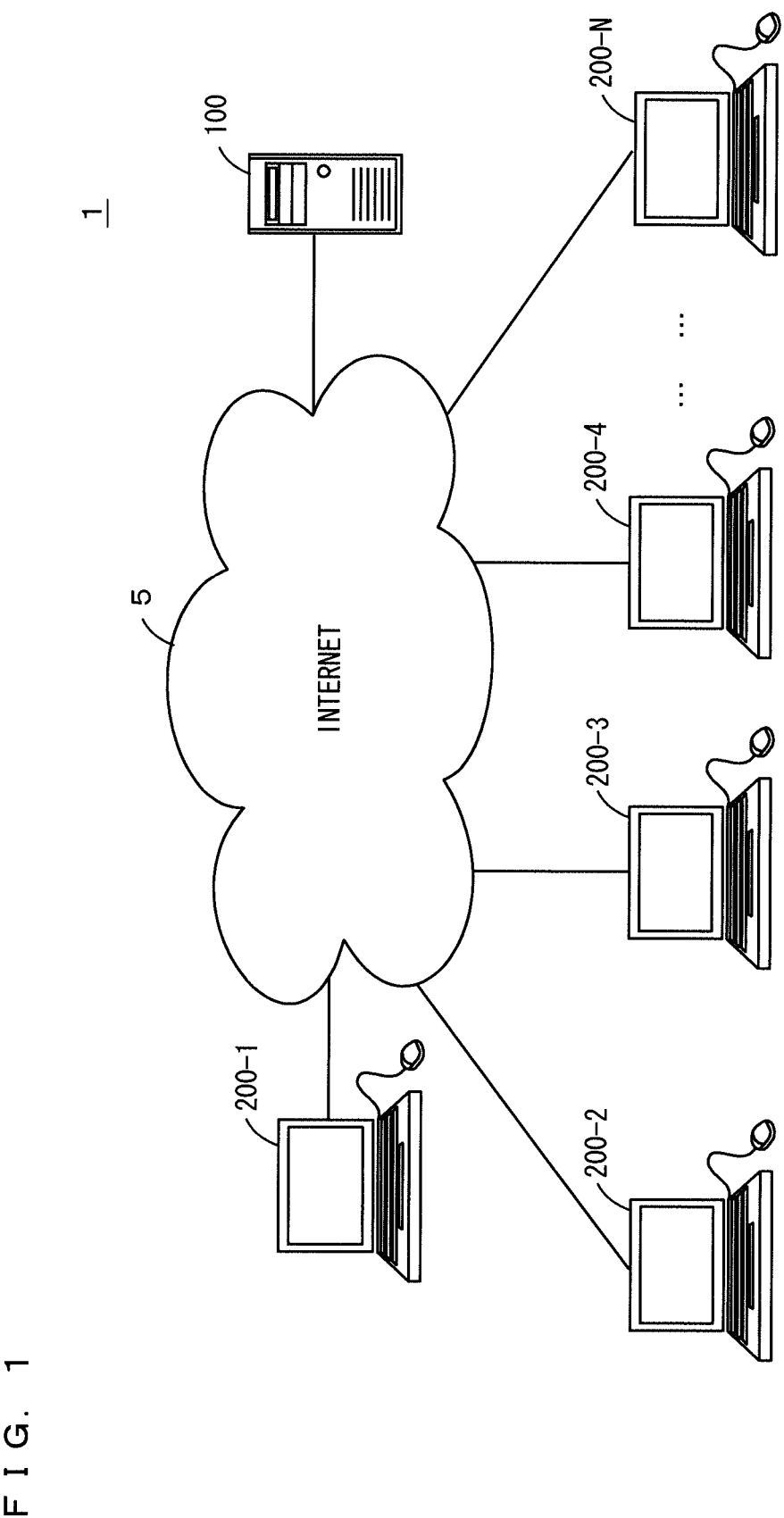
FIG. 1 is a diagram showing one example of the system configuration of a remote conference system according to one embodiment of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same components are denoted by the same reference numerals. Their names and functions are also the same. Therefore, detailed description thereof will not be repeated.

FIG. 1 is a diagram showing one example of the system configuration of a remote conference system in one embodiment of the present invention. The remote conference system 1 is one example of a speech reproduction control system. With reference to FIG. 1, the remote conference system 1 includes a server 100 and personal computers (hereinafter referred to as "PCs") 200-1, 200-2, 200-3, 200-4 to 200-N. Note that N is a positive integer, and is equal to or larger than 5 here. Each of the server 100 and PCs 200-1 to 200-N is connected to the Internet 5 and can communicate with each other.

Each of the PCs 200-1 to 200-N includes a camera, a microphone that collects speeches and a speaker that outputs speech. Each of the PCs 200-1 to 200-N is a general computer, and their main hardware configurations and functions thereof are the same.

Instead of the PCs 200-1 to 200-N, an information communication apparatus such as a PDA (Personal Digital Assistance) or a smartphone may be used as long as the apparatus includes a camera, a microphone, a speaker and a communication function. Further, the network is not limited to the Internet 5, and other networks may be used as long as the server 100 and the PCs 200-1 to 200-N can communicate with each other. The network may be a local area network (LAN) or a wide area network (WAN), for example.

In the remote conference system 1, a conference participant operates any one of the PCs 200-1 to 200-N to participate in a conference. Hereinafter, any one of the PCs 200-1 to 200-N is referred to as a PC 200.

A program for participating in a conference is installed in each of the PCs 200-1 to 200-N, and the conference takes place when each of the PCs 200-1 to 200-N communicate with the server 100. In addition to a dedicated program for communicating with the server 100, the program installed in each of the PCs 200-1 to 200-N may be a general browser program in a case in which the server 100 provides a web service.

The remote conference system is implemented by execution of a speech reproduction control program. The server 100 communicates with the PCs 200-1 to 200-N, and transmits data received from each of the PCs 200-1 to 200-N to each of the other PCs 200-1 to 200-N.

Data transmitted and received between each of the PCs 200-1 to 200-N and the server 100 includes speech data representing a speech, image data representing an image and application data. Images include a still image and a moving image. Data transmitted and received between each of the PCs 200-1 to 200-N and the server 100 may be compressed data or may be uncompressed data.

The server 100 controls data to be transmitted to each of the PCs 200-1 to 200-N. For example, the server 100 can transmit speech data received from each of the PCs 200-1 to 200-N to all of the PCs 200-1 to 200-N. Further, as for image data, the server 100 can collect the image data received from each of the PCs 200-1 to 200-N and transmit the image data to each of the PCs 200-1 to 200-N.

In response to a request from each of the PCs 200-1 to 200-N, the server 100 determines speech data, image data and application data to be transmitted and transmits them.

Therefore, images displayed on the respective PCs 200-1 to 200-N may be the same or different, and speeches output from the respective PCs 200-1 to 200-N may be the same or different. Each of the PCs 200-1 to 200-N may process a plurality of speech data pieces received from the server 100 and output them. In this case, because it is not necessary to execute a process of processing the speech data in the server 100, it reduces a load. Furthermore, each of the PCs 200-1 to 200-N may process a plurality of image data pieces received from the server 100 and display them. In this case, because it is not necessary to execute a process of processing the plurality of image data pieces in the server 100, it reduces a load.

Figure 2:
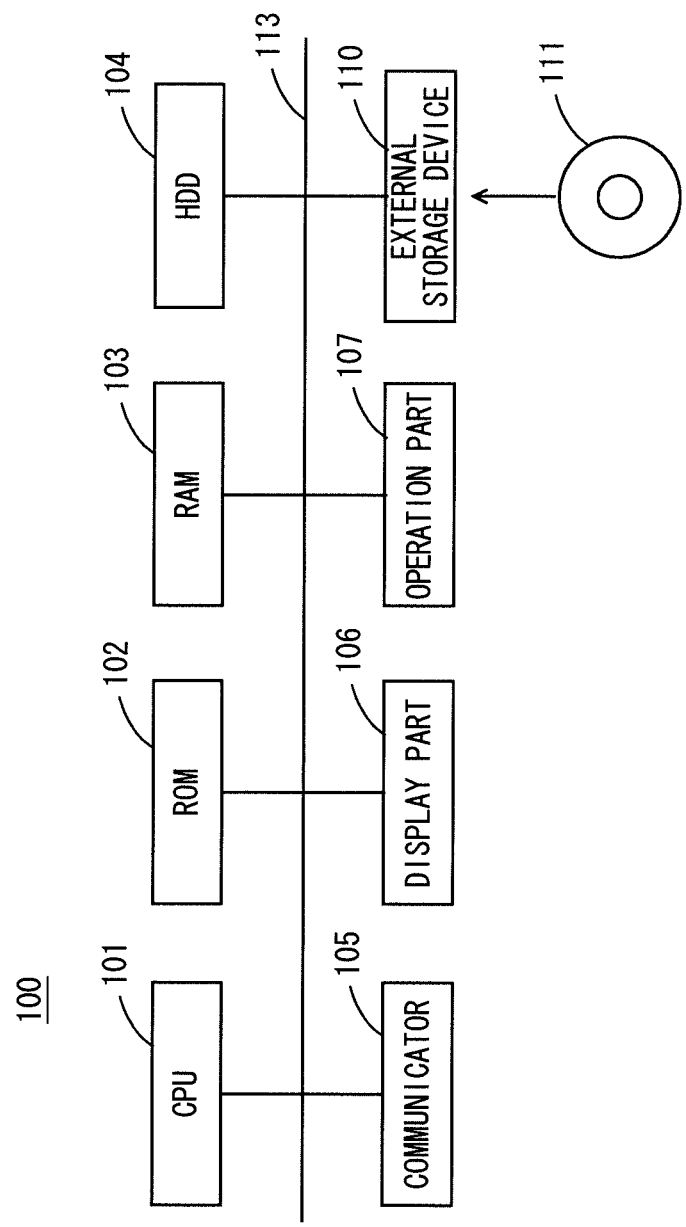
FIG. 2 is a block diagram showing one example of the hardware configuration of a server.

FIG. 2 is a block diagram showing one example of the hardware configuration of the server. With reference to FIG. 2, the server 100 is a computer that executes an arithmetic process and includes a Central Processing Unit (CPU) 101 for controlling the server 100 as a whole, a ROM (Read Only Memory) 102 for storing a program to be executed by the CPU 101, a RAM (Random Access Memory) 103 that is used as a workspace for the CPU 101, a HDD 104 for storing data in a non-volatile manner, a communicator 105 that connects the CPU 101 to the Internet 5, a display part 106 that displays images, an operation part 107 that receives an input operation and an external storage device 110. Each of those is connected to a bus 113.

The communicator 105 is an interface for connecting the server 100 to the Internet 5. Therefore, the CPU 101 can communicate with the PCs 200-1 to 200-N connected to the Internet 5 via the communicator 105.

A CD-ROM (Compact Disk Read Only Memory) 111 is attached to the external storage device 110. The CPU 101 controls the external storage device 110 to read the data stored in the CD-ROM 111.

In the present embodiment, the CPU 101 executes a program stored in the ROM 102 or the HDD 104. Further, the CPU 101 may control the external storage device 110 to read a program to be executed by the CPU 101 from the CD-ROM 111, and may store the read program in the RAM 103 for execution.

Further, the CPU 101 downloads a program from a computer connected to the Internet 5, and stores the program in the HDD 104. Further, in a case in which the computer connected to the Internet 5 writes a program into the HDD 104, the program is stored in the HDD 104. The CPU 101 may load the program stored in the HDD 104 into the RAM 103 and execute the program.

A recording medium for storing a program to be executed by the CPU 101 is not limited to the CD-ROM 111 but may be a flexible disc, a cassette tape, an optical disc (MO (Magnetic Optical Disc)/MD(Mini Disc)/DVD(Digital Versatile Disc)), an IC card, an optical card, or a semiconductor memory such as a mask ROM or an EPROM (Erasable Programmable ROM). The program referred to here includes not only a program directly executable by the CPU 101 but also a source program, a compressed program, an encrypted program and the like.

Figure 3:
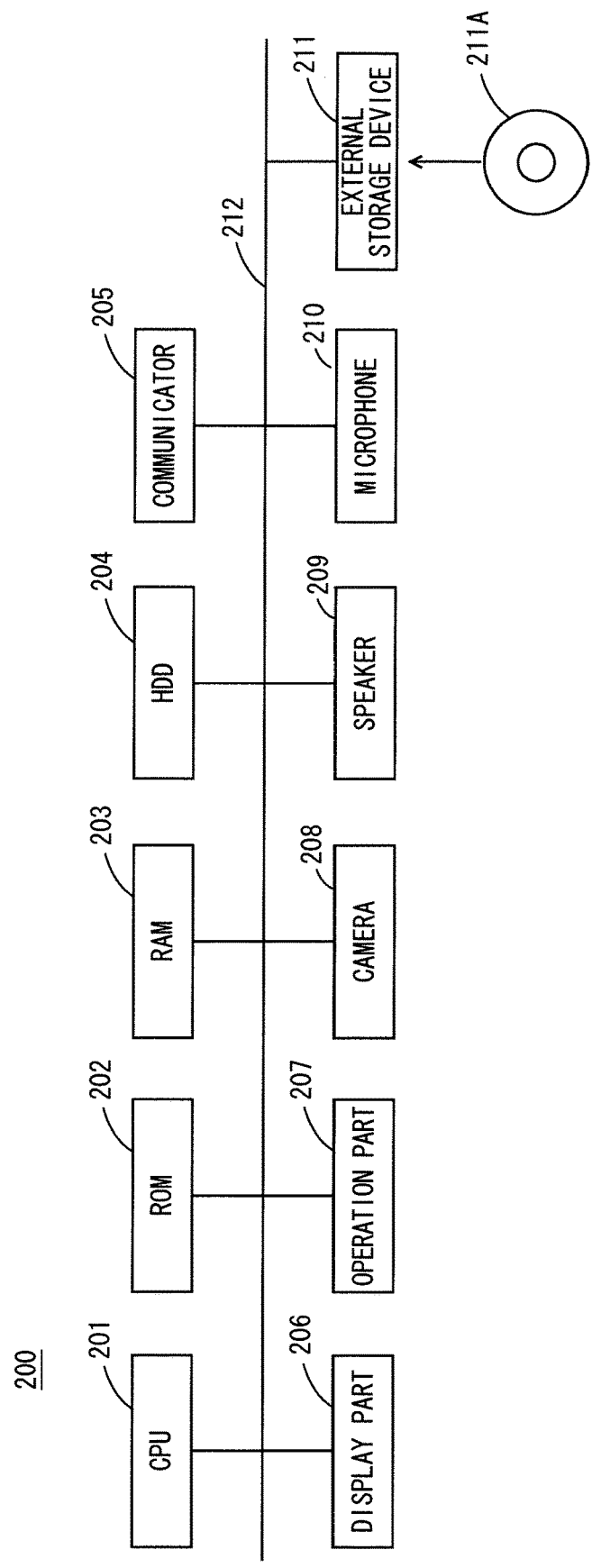
FIG. 3 is a block diagram showing one example of the hardware configuration of a PC.

FIG. 3 is a block diagram showing one example of the hardware configuration of the PC. With reference to FIG. 3, the PC 200 is a computer that executes an arithmetic process, and includes a CPU 201 for controlling the PC 200 as a whole, a ROM 202 for storing a program to be executed by the CPU 201, a RAM 203 that is used as a workspace for the CPU 201, a HDD 204 for storing data in a non-volatile manner, a communicator 205 that connects the CPU 201 to the Internet 5, a display part 206 that displays images, an operation part 207 that receives an input operation performed by a participant who is a user, a camera that picks up an image of a participant, a speaker 209 that outputs a speech, a microphone 210 that collects a speech of an operator and an external storage device 211. Each of those is connected to a bus 212.

A CD-ROM 211A is attached to the external storage device 211. The CPU 201 controls the external storage device 211 to read the data stored in the CD-ROM 211A.

A module in which at least two of the camera 208, the speaker 209 and the microphone 210 are integrated may be connected to the PC 200. The module includes a headset in which the speaker 209 and the microphone 210 are integrated, for example.

Figure 4:
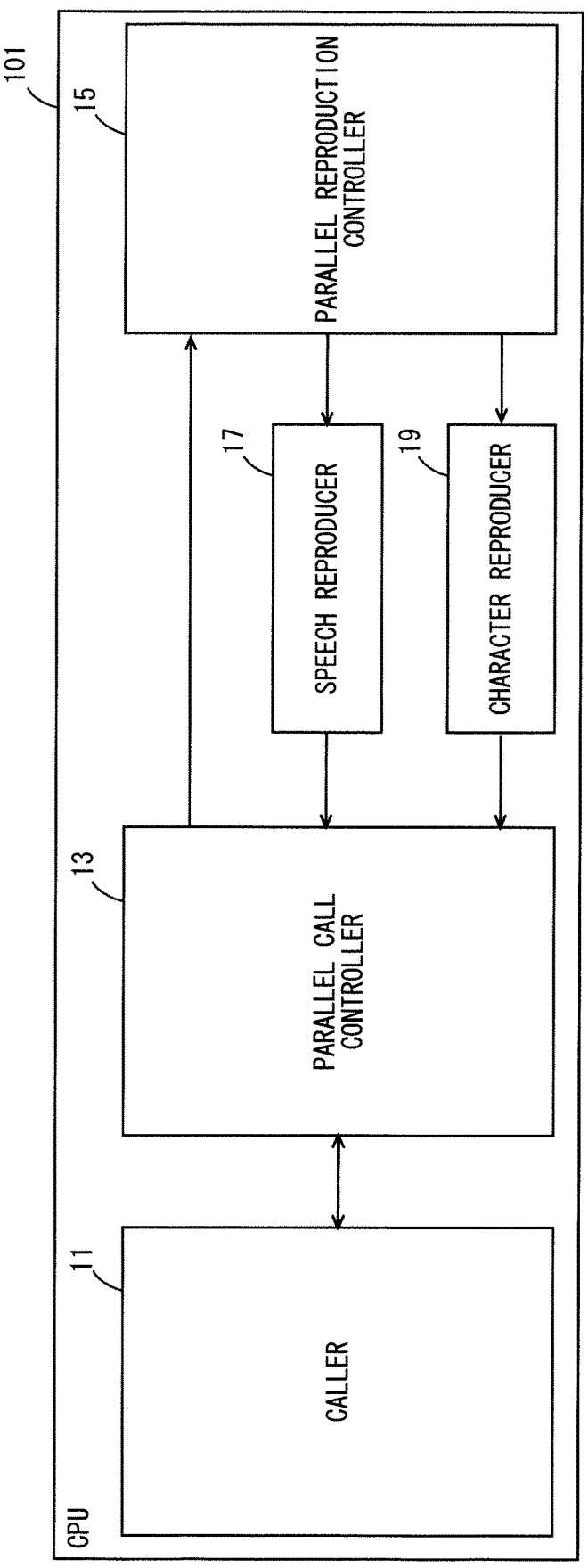
FIG. 4 is a diagram showing one example of the functions of a CPU included in the server in the present embodiment.

FIG. 4 is a diagram showing one example of the functions of the CPU included in the server in the present embodiment. The functions shown in FIG. 4 are implemented by the CPU 101 included in the server 100 when the CPU 101 executes a terminal-side speech reproduction control program stored in the ROM 102, the HDD 104 or the CD-ROM 111. The terminal-side speech reproduction control program is part of the speech reproduction control program. With reference to FIG. 4, the CPU 101 includes a caller 11, a parallel call controller 13, a parallel reproduction controller 15, a speech reproducer 17 and a character reproducer 19.

The caller 11 controls a call among a plurality of users. In a group including two or more users, the caller 11 enables a call among the two or more users belonging to the group. The caller 11 transmits a speech of one user belonging to the group to all of the other users belonging to the group. The caller 11 regards respective calls of the plurality of groups as separate calls. In other words, the caller 11 regards a call within one group as a call separate from a call within another group. Thus, the call within the one group is not transmitted to users belonging to the other groups. Note that the same user may be included in the plurality of groups.

The caller 11 determines a group of users participating in a call, and determines PCs to be operated by a plurality of users belonging to the same group. In regard to the plurality of the PCs 200 belonging to the same group, the caller 11 transmits data received from one PC 200 to one or more PCs 200 which are other than the one PC.

In the following description, N users P-1 to P-N respectively operate the PCs 200-1 to 200-N, by way of example. Data to be transmitted and received between the communicator 105 and the PCs 200-1 to 200-N includes at least speech data. The data to be transmitted and received between the communicator 105 and the PCs 200-1 to 200-N may include image data including still images or videos.

For example, in a case in which the users P-1 to P-M (M is an integer smaller than N) participates in a conference, the caller 11 determines that the PCs 200-1 to 200-M respectively operated by the users P-1 to P-M are in the same group. The caller 11 controls the communicator 105, and receives speech data from one of the PCs 200-1 to 200-M belonging to the same group, e.g. the PC 200-1, and transmits the received speech data to all of the PCs 200-2 to 200-M that are other than the PC 200-1. Further, in a case in which a call is made between the user P-1 and the user P-2, the caller 11 determines that the PCs 200-1, 200-2 that are respectively operated by the users P-1 and P-2 are in the same group. The caller 11 transmits data received from one of the PC 200-1 and the PC 200-2 to the other one of the PC 200-1 and the PC 200-2.

The parallel call controller 13 executes a call within a first group and a call within a second group in parallel. In a case in which there is a specific user belonging to both of the first group and the second group, the parallel call controller 13 executes a call within the first group and a call within the second group in parallel for the specific user. The parallel call controller 13 outputs the speech data of the call within the first group and the speech data of the call within the second group to the parallel reproduction controller 15.

Note that the parallel call controller 13 may prohibit a call within the second group. For example, in a case in which any one of the plurality of users belonging to the first group prohibits a call within the second group, a call within the second group is prohibited. When a call within the second group is prohibited, the parallel call controller 13 prohibits a call within the second group.

The parallel reproduction controller 15 outputs the speech data of a call within the first group and the speech data of a call within the second group to the speech reproducer 17 and the character reproducer 19. The parallel reproduction controller 15 controls the speech reproducer 17 and the character reproducer 19 to reproduce the speech data of a call within the first group and the speech data of a call within the second group in parallel.

The speech reproducer 17 reproduces speech data in speech. The speech reproducer 17 outputs the reproduced speech to the parallel call controller 13.

The character reproducer 19 reproduces speech data by converting the speech data into characters. Specifically, the character reproducer 19 converts the speech data into characters by speech recognition. The character reproducer 19 outputs character information including characters into which the speech data has been converted to the parallel call controller 13. The character reproducer 19 may specify a user who is uttering a speech based on the speech data and output character information to which user identification information for identifying the specified user is added to the parallel call controller 13. Further, the character reproducer 19 may translate the character information into which the speech data has been converted into another language, and may output the translated character information to the parallel call controller 13.

The parallel reproduction controller 15 controls the character reproducer 19 and causes the character reproducer 19 to reproduce the first speech data representing a call within the first group. In parallel with the reproduction of the first speech data by the character reproducer 19, the parallel reproduction controller 15 controls the speech reproducer 17, causes the speech reproducer 17 to reproduce the second speech data of the call within the second group, and causes the speech reproducer 17 not to reproduce the first speech data or to reproduce the first speech data at a volume lower than that for the second speech data. The speech reproducer 17 treats the speech of the specific user not as a call within the first group but as a call within the second group. Therefore, a speech uttered by the specific user is not included in the first speech data but is included in the second speech data.

The parallel call controller 13 outputs the user identification information for identifying the specific user, the speech data of a speech reproduced by the speech reproducer 17 and the character information reproduced by the character reproducer 19 to the caller 11.

The caller 11 transmits the speech data and the character information to the PC 200 operated by the specific user. Instead of transmission of the character information, the character information may be superimposed on the image data to be transmitted to the PC 200 operated by the specific user.

In response to the start of a call within the second group while a call within the first group is in progress in the caller 11, the parallel reproduction controller 15 executes a call within the first group and a call within the second group in parallel. After the call within the second group is started while the call within the first group is in progress in the caller 11, the parallel reproduction controller 15 may execute a call within the first group and a call within the second group in parallel in response to acceptance of a start instruction indicating the start of the parallel call from the specific user.

Further, in a case in which a switch instruction is accepted from the specific user during execution of the call within the first group and the call within the second group in parallel, the parallel reproduction controller 15 may switch between the reproduction of the call within the first group and the reproduction of the call within the second group. Specifically, in response to acceptance of the switch instruction, the parallel reproduction controller 15 controls the character reproducer 19, causes the character reproducer 19 to reproduce the second speech data, controls the speech reproducer 17, causes the speech reproducer 17 to reproduce the first speech data, and causes the speech reproducer 17 not to reproduce the second speech data or to reproduce the second speech data at a volume lower than that for the first speech data.

Figure 5:
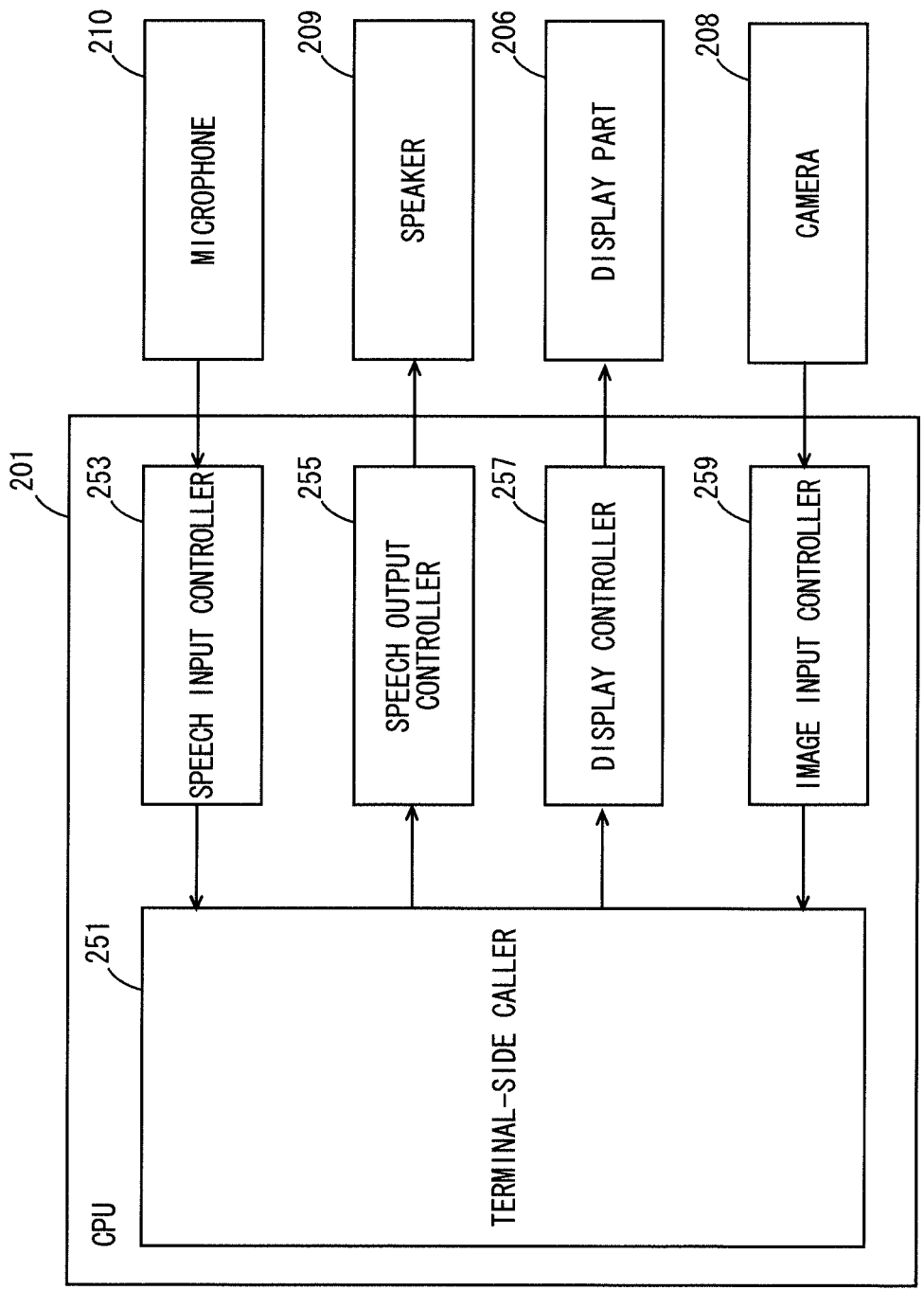
FIG. 5 is a diagram showing one example of the functions of the CPU included in the PC in the present embodiment.

FIG. 5 is a diagram showing one example of the functions of the CPU included in the PC in the present embodiment. The functions shown in FIG. 5 are implemented by the CPU 201 when the CPU 201 included in the PC 200 executes a reproduction program stored in the ROM 202, the HDD 204 or the CD-ROM 211A. The reproduction program is part of the speech reproduction control program. With reference to FIG. 5, the CPU 201 included in the PC 200 includes a terminal-side caller 251, a speech input controller 253, a speech output controller 255, a display controller 257 and an image input controller 259.

The terminal-side caller 251 controls a call between a user operating the PC 200 and another user. The number of other users is equal to or larger than one. In a group consisting of the user who operates the PC 200 and one or more users, the terminal-side caller 251 enables a call among the user who operates the PC 200 and the other one or more users.

The terminal-side caller 251 controls the communicator 205 to receive speech data and character information from the server 100. The terminal-side caller 251 outputs speech data received from the server 100 to the speech output controller 255, and outputs character information received from the server 100 to the display controller 257. In a case in which image data is received from the server 100, the terminal-side caller 251 outputs an image of the image data to the display controller 257.

In response to reception of character information from the terminal-side caller 251, the display controller 257 causes the display part 206 to display an image of the character information. In response to reception of image data from the terminal-side caller 251, the display controller 257 causes the display part 206 to display an image of the image data. Further, in response to reception of character information and image data from the terminal-side caller 251, the display controller 257 causes the display part 206 to display the image of the character information and the image of the image data. The image of the character information and the image of the image data may be displayed separately, or the image of the character information may be superimposed on the image of the image data. The speech output controller 255 reproduces speech data. Specifically, the speech output controller 255 converts speech data in the form of a digital signal into an analog signal, and outputs analog speech data to the speaker 209. Thus, the speech of the speech data is output from the speaker 209.

The speech input controller 253 receives analog speech data that is output by the microphone 210. The speech input controller 253 converts the analog speech data into digital speech data, and outputs the converted speech data to the terminal-side caller 251. The speech input controller 253 may compress the speech data and output the compressed speech data to the terminal-side caller 251. The speech data output by the speech input controller 253 to the terminal-side caller 251 corresponds to a speech uttered by the user operating the PC 200.

The image input controller 259 receives analog image data output by the camera 208. The image input controller 259 converts the analog image data into digital image data and outputs the converted image data to the terminal-side caller 251.

The terminal-side caller 251 controls the communicator 205 to transmit the speech data received from the speech input controller 253 and the image data received from the image input controller 259 to the server 100.

An operation of the speech reproduction system will be described below with the PC 200-1 operated by the user P-1 as an example.

Figure 6:
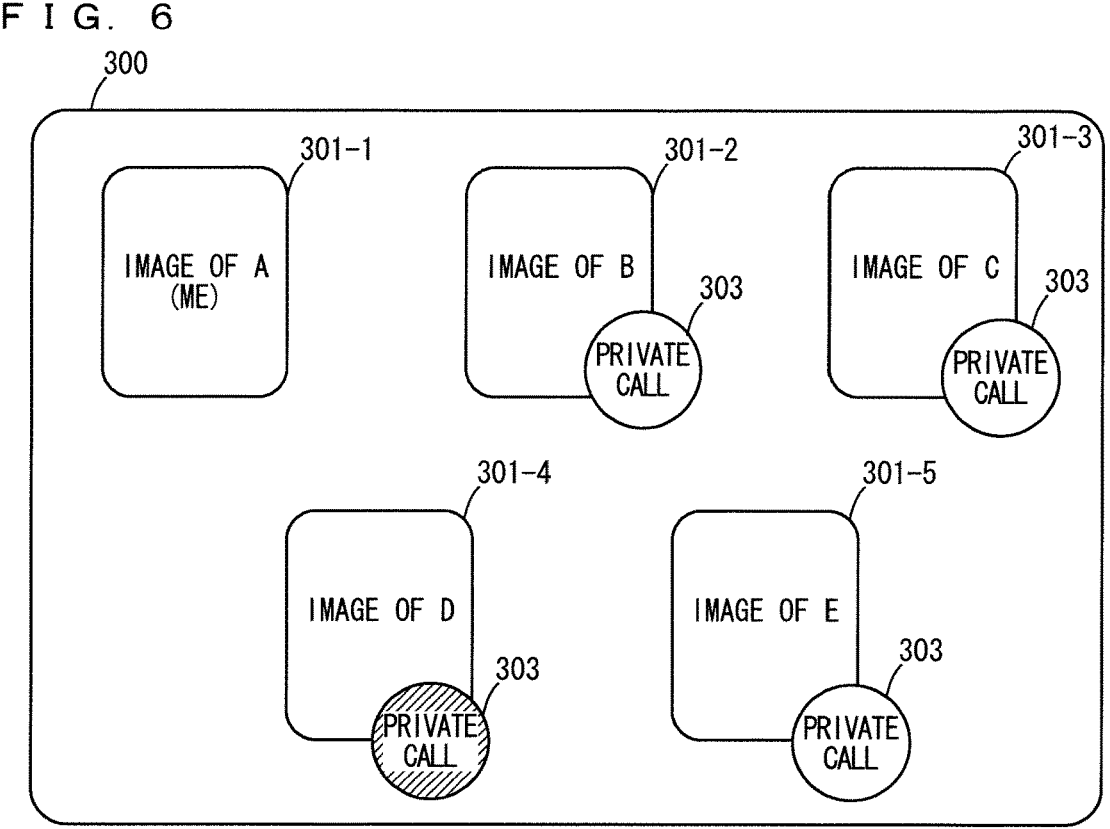
FIG. 6 is a first diagram showing one example of an operation screen.

FIG. 6 is a first diagram showing one example of an operation screen. The operation screen 300 is a screen displayed on the display part 206 of the PC 200-1 in a case in which the five users P-1 to P-5 are having a conference. On the operation screen 300, images 301-1 to 301-5 are displayed. The images 301-1 to 301-5 are the images picked up by the cameras 208 respectively included in the PCs 200-1 to 200-5. The images 301-1 to 301-5 correspond to the users P-1 to P-5, respectively. In this state, in the server 100, a call among the five users P-1 to P-5 is treated as a call within a first group.

In a state in which the operation screen 300 is displayed on the display part 206 of the PC 200-1, the reproduction mode is a normal mode in each of the server 100 and the PCs 200-1 to 200-5. A speech uttered by each of the users P-2 to P-5 is output from the speaker 209 of the PC 200-1 as the speech of the conference. Further, a speech uttered by the user P-1 is collected by the microphone 210 of the PC 200-1 and output from the respective speakers 209 of the respective PCs 200-2 to 200-5.

On the lower right portion of each of the images 301-2 to 301-5 other than the image 301-1 corresponding to the user P-1, a button 303 in which the characters representing a private call are displayed in a superimposed manner. The user P-1 can designate a party for another call different from the currently held conference call by pressing the button 303 in which the characters representing a private call are displayed in a superimposed manner in the lower right portion of each of the images 301-2 to 300-5. Here, the hatching represents designation of the button 303 displayed in the lower right portion of the image 301-4 corresponding to the user P-4.

Figure 7:
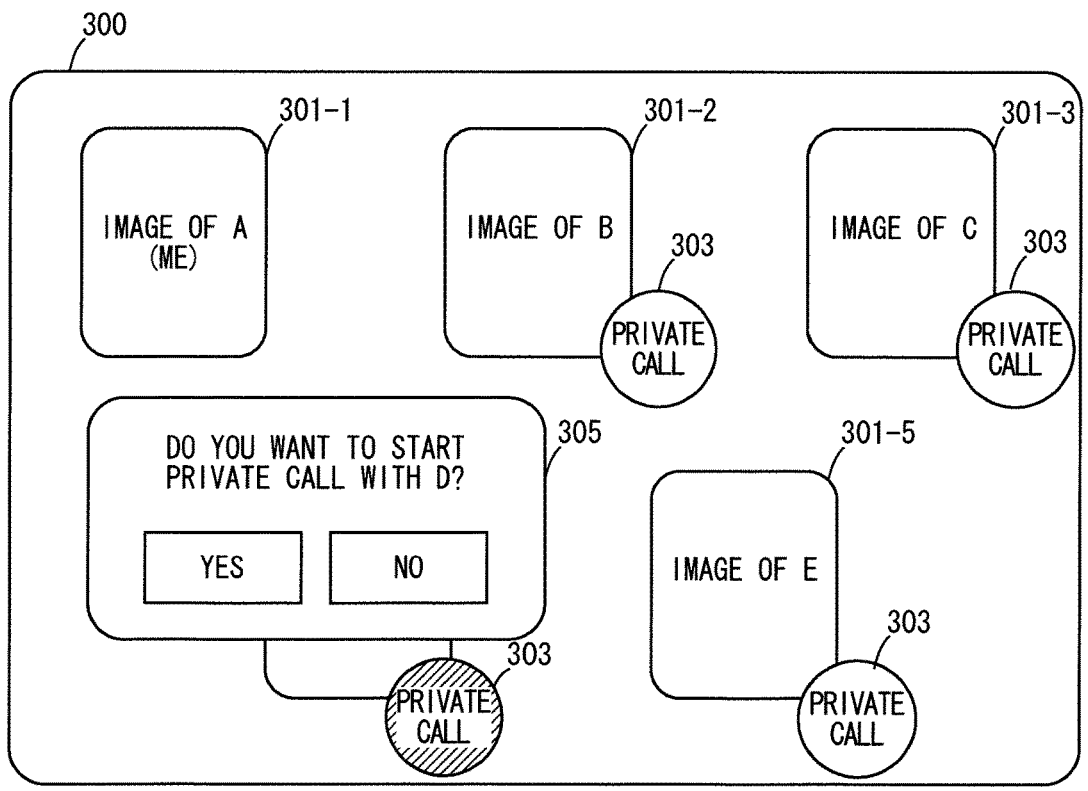
FIG. 7 is a diagram showing one of an invitation instruction screen.

FIG. 7 is a diagram showing one example of an invitation instruction screen.

With reference to FIG. 7, the invitation instruction screen 305 is a pop-up screen, and is displayed on the display part 206 while being superimposed on the operation screen 300. The invitation instruction screen 305 is displayed in response to designation of the button 303 displayed in the lower right portion of each of the images 301-2 to 301-5 on the operation screen 300 by the user P-1. In FIG. 7, the invitation instruction screen 305 is displayed in a case in which the button 303 displayed in the lower right portion of the image 300-4 on the operation screen 301 is designated by the user P-1.

The invitation instruction screen 305 includes the message "DO YOU WANT TO START PRIVATE CALL WITH D?," a button in which the characters for "YES" are displayed and a button in which the characters for "NO" are displayed. When the user P-1 designates the button in which the characters for "YES" are displayed, an invitation acceptance screen is displayed on the display part 206 of the PC 200-4 operated by the user P-4.

Figure 8:
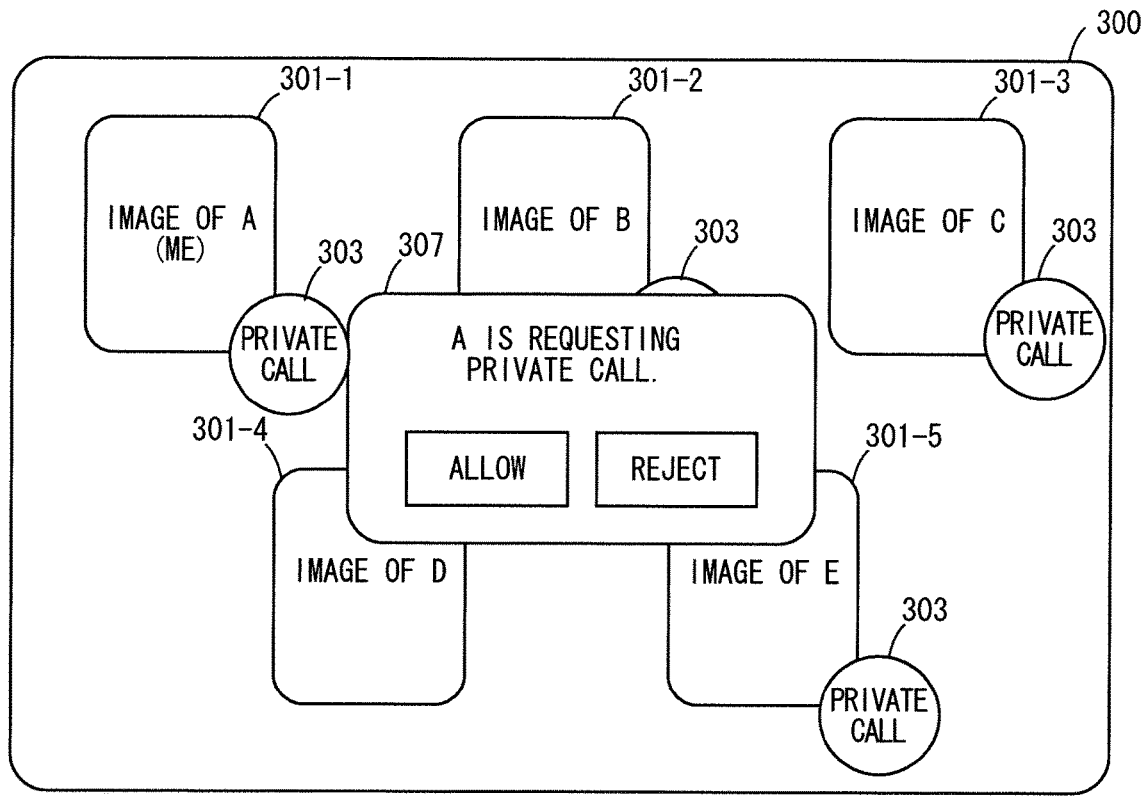
FIG. 8 is a first diagram showing one example of an invitation acceptance screen.

FIG. 8 is a first diagram showing one example of the invitation acceptance screen. Here, the operation screen 300 and the invitation acceptance screen 307 displayed on the display part 206 of the PC 200-4 operated by the user P-4 are shown. With reference to FIG. 8, the invitation acceptance screen 307 is a pop-up screen, and is displayed on the display part 206 while being superimposed on the operation screen 300. The invitation acceptance screen 307 includes the message "A IS REQUESTING PRIVATE CALL," a button in which the characters for "ALLOW" are displayed and a button in which the characters for "REJECT" are displayed. When the user P-4 designates the button in which the characters for "ALLOW" are displayed, a call between the user P-1 and the user P-4 is enabled. In this case, in each of the server 100, the PC 200-1 and the PC 200-4, the reproduction mode is switched to a parallel reproduction mode. In case of the parallel reproduction mode, in the server 100, the call between the user P-1 and the user P-4 is treated as a call within a second group. When the user P-4 designates the button in which the characters for "REJECT" are displayed, a call between the user P-1 and the user P4 is not realized, and the reproduction mode is maintained in the normal mode and is not switched to the parallel reproduction mode in each of the server 100, the PC 200-1 and the PC 200-4.

Figure 9:
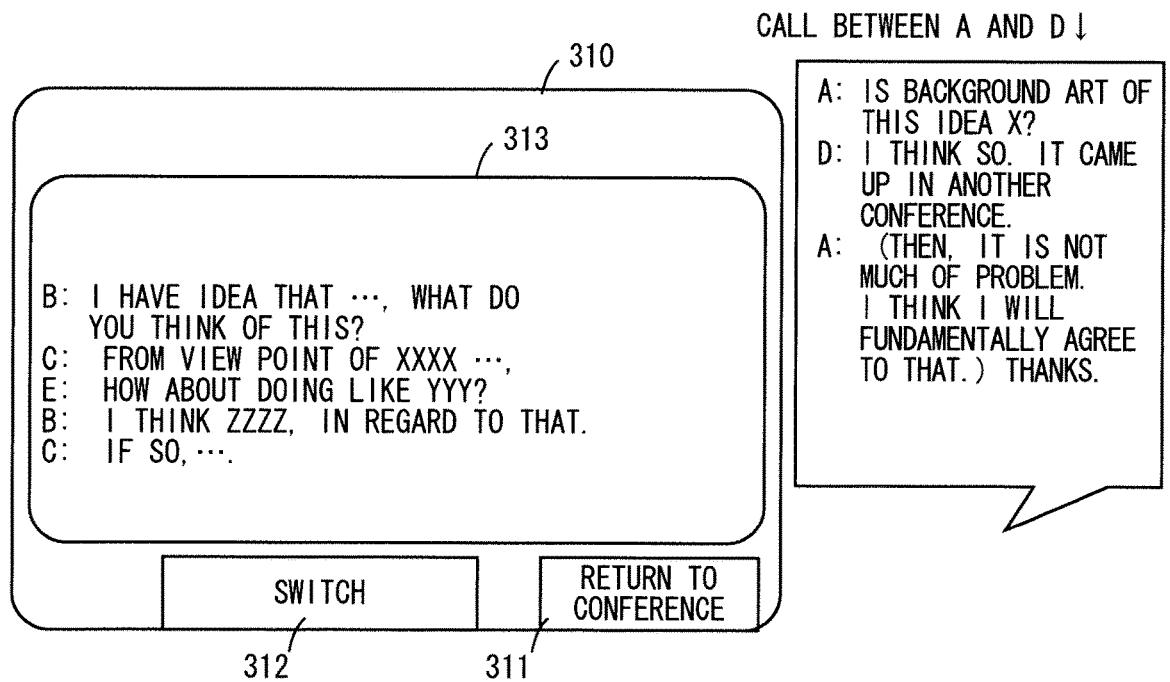
FIG. 9 is a first diagram showing one example of a parallel reproduction screen.

FIG. 9 is a first diagram showing one example of a parallel reproduction screen. The parallel reproduction screen 310 shown in FIG. 9 is displayed on the display part 206 of the PC 200-1 operated by the user P-1. The parallel reproduction screen 310 includes a first group display area 313, a button 311 in which the character string for "RETURN TO CONFERENCE" is displayed and a button 312 in which the character string for "SWITCH" is displayed. In the parallel reproduction mode, the users P-1 to P-5 belong to the first group, and the users P-1 and P-4 belong to the second group.

In the first group display area 313, a call among the users P-2, P-3, P-5 that belong to the first group and do not belong to the second group is displayed as character information. In FIG. 9, the character information corresponding to a speech of each of the users P-2, P-3, P-5 is displayed. Further, the character information is displayed from the top to the bottom in the order of utterance of speeches. Further, user identification information is displayed at the beginning of the character information as the information for specifying the user who has uttered a speech. Here, the user identification information pieces for respectively identifying the users P-2, P-3, P-5 are B, C and E.

The call between the users P-1, P-4 belonging to the second group is reproduced in speech. In FIG. 9, the speech is shown in characters in the balloon. The call between the users P-1, P-4 belonging to the second group is not transmitted to the users P-2, P-3, P-5.

In this manner, the user P-1 can have a call with the user P-4 through a speech while identifying the contents of the respective utterances of the users P-2, P-3, P-5 through the character information displayed in the first group display area 313.

When the user P-1 designates the button 311, the call within the second group ends, and it returns to only the call within the first group. In this case, the operation screen 300 shown in FIG. 6 is displayed on the display part 206, and the call among the users P200-1 to P200-5 belonging to the first group is resumed through a speech.

When the user P-1 designates the button 312, the reproduction for the first group and the reproduction for the second group are switched.

Figure 10:
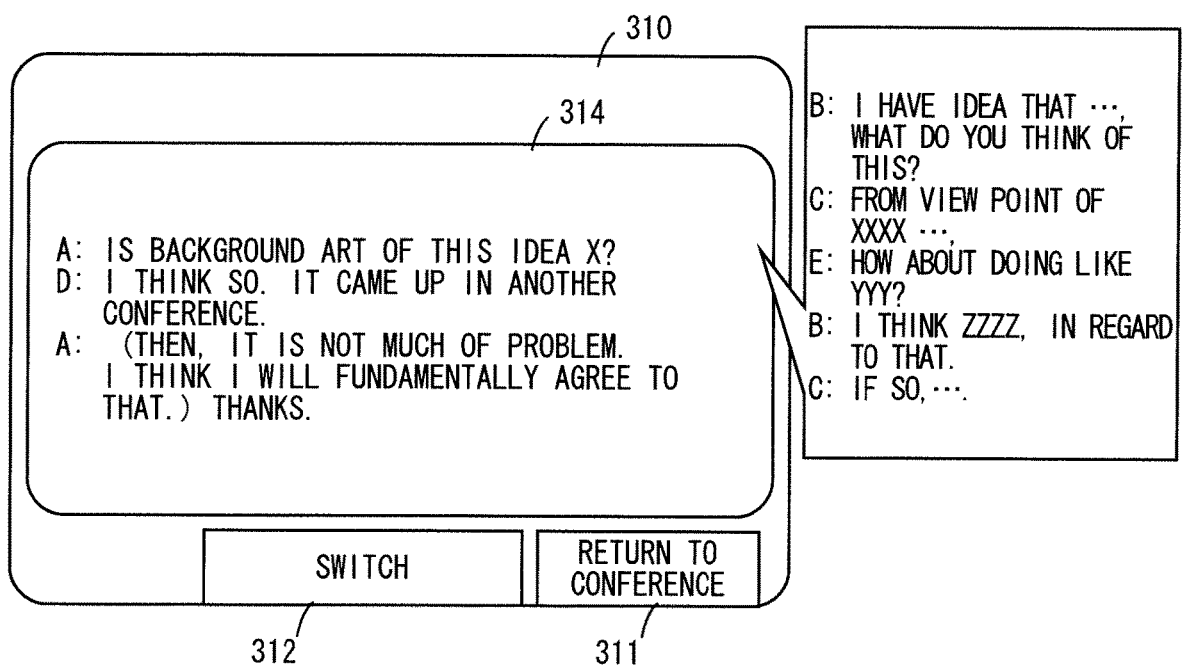
FIG. 10 is a second diagram showing one example of the parallel reproduction screen.

FIG. 10 is a second diagram showing one example of the parallel reproduction screen. The parallel reproduction screen 310 shown in FIG. 10 is displayed on the display part 206 of the PC 200-1 when the user P-1 designates the button 312 in the parallel reproduction screen 310 shown in FIG. 9. The parallel reproduction screen 310 shown in FIG. 10 includes a second group display area 314, the button 311 in which the character string for "RETURN TO CONFERENCE" is displayed and the button 312 in which the character string for "SWITCH" is displayed. In the parallel reproduction mode, the users P200-1 to P200-5 belong to the first group, and the users 200-1, 200-4 belong to the second group.

The second group display area 314 is an area relating to a call within the second group. In the second group display area 314, the call between the users P-1, P-4 belonging to the second group is displayed as character information. In FIG. 10, the character information corresponding to the speech of each of the users P-1, P-4 is displayed. Further, the character information is displayed from the top to the bottom in the order of utterance of speeches. Further, user identification information is displayed at the beginning of the character information as the information for specifying the user who has uttered a speech. Here, the user identification information pieces for respectively identifying the users P-1, P-4 are A and D.

The call among the users P-2, P-3, P-5 who belong to the first group and do not belong to the second group is reproduced in speech. In FIG. 10, the speech is shown in characters in the balloon. The call between the users P-1, P-4 belonging to the second group is not transmitted to the users P-2, P-3, P-5.

In this manner, the user P-1 can confirm the utterances of the users P-2, P-3, P-5 through a speech while identifying the contents of the respective utterances of the respective users P-1, P-4 through the character information displayed in the second group display area 314.

When the user P-1 designates the button 311, the call within the second group ends, and it returns to only the call within the first group. In this case, the operation screen 300 shown in FIG. 6 is displayed on the display part 206, and the call among the users P-1 to P-5 belonging to the first group are resumed through a speech.

When the user P-1 designates the button 312, the reproduction for the first group and the reproduction for the second group are switched. In this case, the parallel reproduction screen 310 shown in FIG. 9 is displayed on the display part 206 of the PC 200-1.

Figure 11:
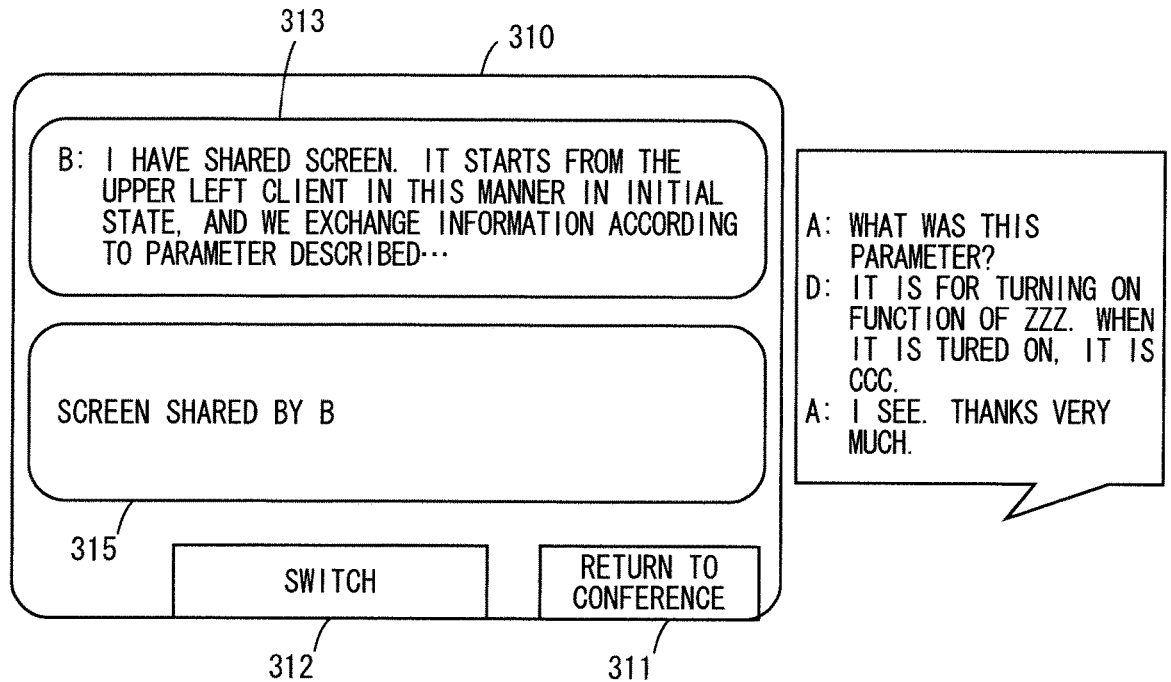
FIG. 11 is a third diagram showing one example of the parallel reproduction screen.

FIG. 11 is a third diagram showing one example of the parallel reproduction screen. The parallel reproduction screen 310 shown in FIG. 11 is different from the parallel reproduction screen 310 shown in FIG. 9 in that a shared screen display area 315 is added. Here, the screen shared within the first group by the user P-2 is displayed in the shared screen display area 315. The screen displayed in the shared screen display area 315 is a screen, which the PC 200-2 operated by the user P-2 has provided an instruction for sharing within the first group and which is displayed on the display part 206 of the PC 200-2. The screen displayed in the shared screen display area 315 is transmitted from the PC 200-2 to the PCs 200-1, 200-3 to 200-5 via the server 100.

The call between the users P-1, P-4 belonging to the second group is output in speech, and is represented by characters in the balloon in FIG. 10.

Figure 12:
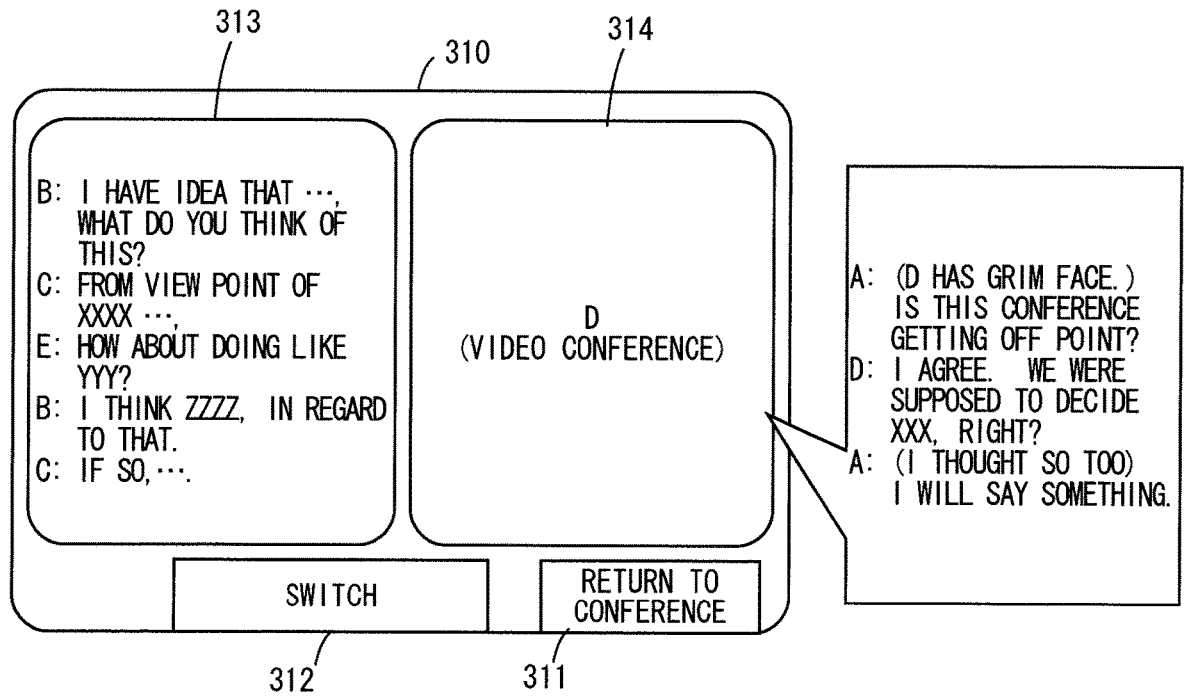
FIG. 12 is a fourth diagram showing one example of the parallel reproduction screen.

FIG. 12 is a fourth diagram showing one example of the parallel reproduction screen. The parallel reproduction screen 310 shown in FIG. 12 is different from the parallel reproduction screen 310 shown in FIG. 9 in that a second group display area 314 is added. Here, the first group display area 313 and the second group display area 314 are arranged side by side. While the first group display area 313 is an area relating to the call within the first group, the second group display area 314 is an area relating to the call within the second group. Here, in the second group display area 314, an image obtained when the image of the user P-4 belonging to the second group is picked up is displayed. The second group display area 314 may be a screen shared within the second group.

The call between the users P-1, P-4 belonging to the second group is output in speech and are represented by the characters in the balloon in FIG. 11.

Figure 13:
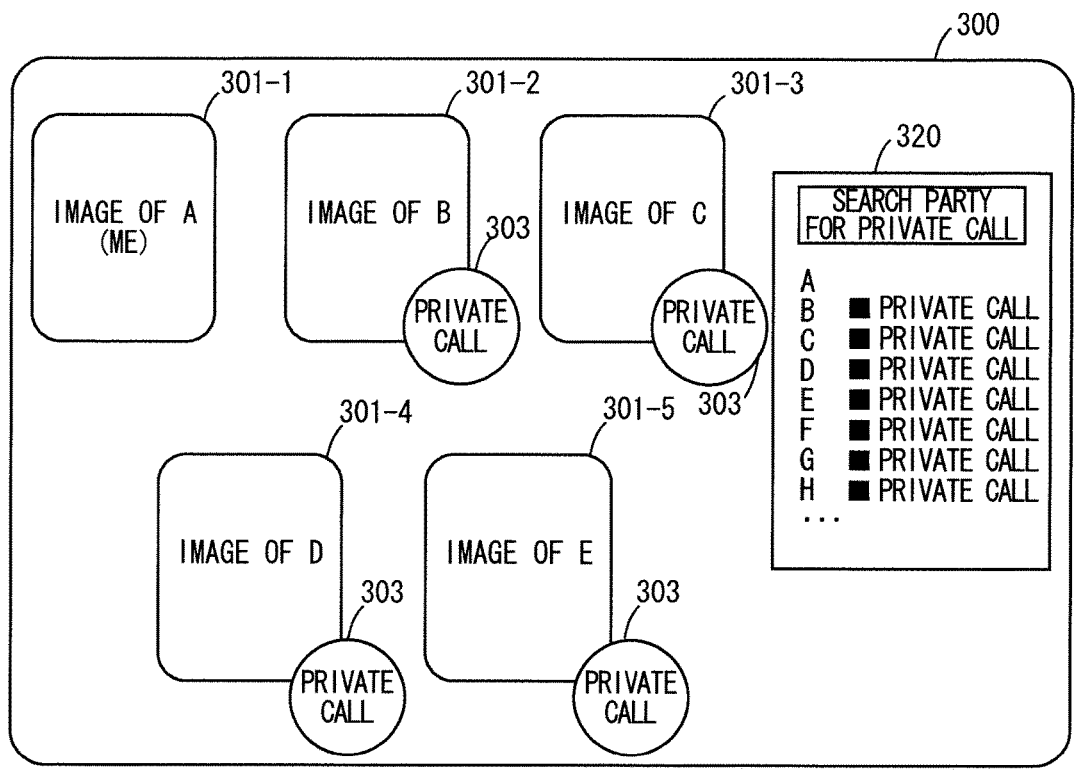
FIG. 13 is a second diagram showing one example of an operation screen.

FIG. 13 is a second diagram showing one example of the operation screen. The operation screen 300 shown in FIG. 13 is different from the operation screen 300 shown in FIG. 6 in that a call list 320 is added. The call list 320 is a table in which the user identification information pieces of users with whom the user P-1 can have a call is listed. The user identification information pieces included in the call list 320 include the other users P-6 to P-N in addition to the users P-1 to P-5 belonging to the first group.

When the user P-1 designates one or more user identification information pieces displayed in the call list 320, the reproduction mode is switched from the normal mode to the parallel reproduction mode. Here, the user identification information piece F of the user P-6 is designated, by way of example.

Figure 14:
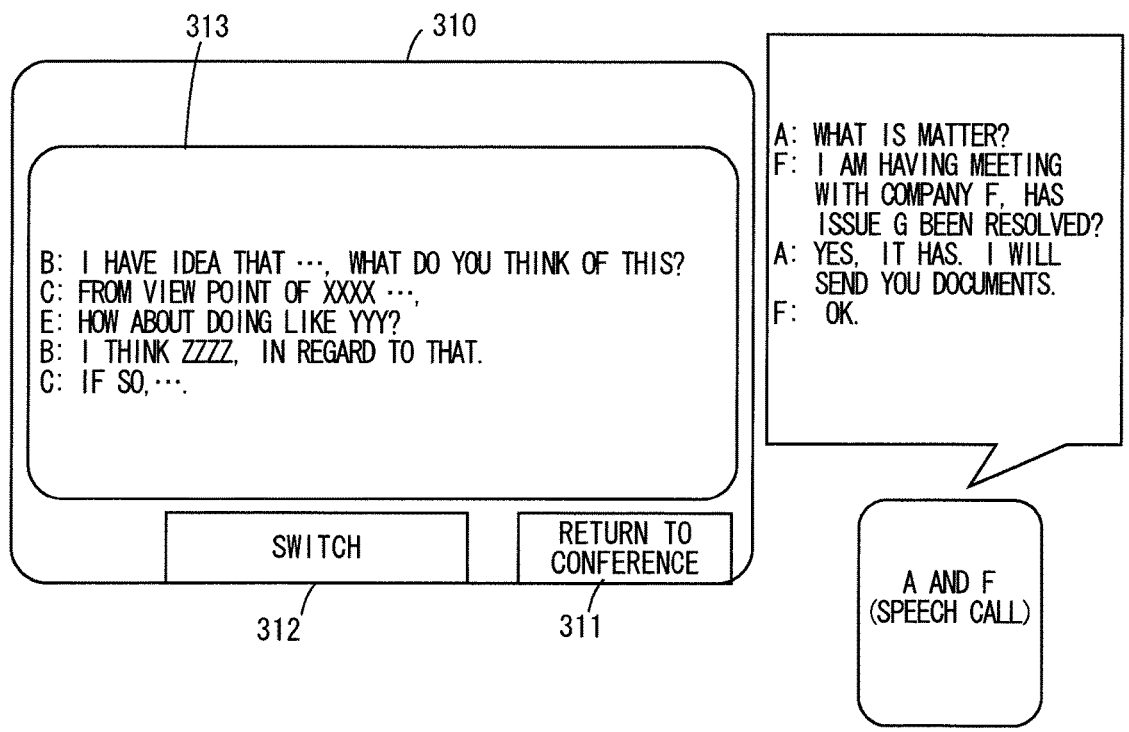
FIG. 14 is a fifth diagram showing one example of the parallel reproduction screen.

FIG. 14 is a fifth diagram showing one example of the parallel reproduction screen. The parallel reproduction screen 310 shown in FIG. 14 is displayed on the display part 206 of the PC 200-1 when the user P-1 designates the user identification information piece F displayed in the call list 320 of the operation screen 300 shown in FIG. 13.

The parallel reproduction screen 310 shown in FIG. 14 includes the first group display area 313, the button 311 in which the character string for "RETURN TO CONFERENCE" is displayed and the button 312 in which the character string for "SWITCH" is displayed. In the parallel reproduction mode, the users P200-1 to P200-5 belong to the first group, and the users P200-1, P200-6 belong to the second group.

In the first group display area 313, the call among the users P-2 to P-5 that belong to the first group and do not belong to the second group is displayed as character information. In FIG. 14, the character information corresponding to the speech of each of the users P-2 to P-5 is displayed. Further, the character information is displayed from the top to the bottom in the order of utterance of speeches. Further, user identification information is displayed at the beginning of the character information as the information for specifying the user who has uttered a speech. Here, the user identification information pieces for respectively identifying the users P-2 to P-5 are B, C, D and E.

The call between the users P-1, P-6 belonging to the second group is reproduced in speech. In FIG. 14, the speech is represented by characters in the balloon. The call between the users P-1, P-6 belonging to the second group is not transmitted to the users P-2 to P-5.

In this manner, the user P-1 can have a call with the user P-6 through a speech while identifying the content of the utterance of each of the users P-2 to P-5 through the character information displayed in the first group display area 313.

When the user P-1 designates the button 311, the call within the second group ends, and it returns to only the call within the first group. In this case, the operation screen 300 shown in FIG. 13 is displayed on the display part 206, and the call among the users P200-1 to P200-5 belonging to the first group is resumed through a speech.

When the user P-1 designates the button 312, the reproduction for the first group and the reproduction for the second group are switched.

Figure 15:
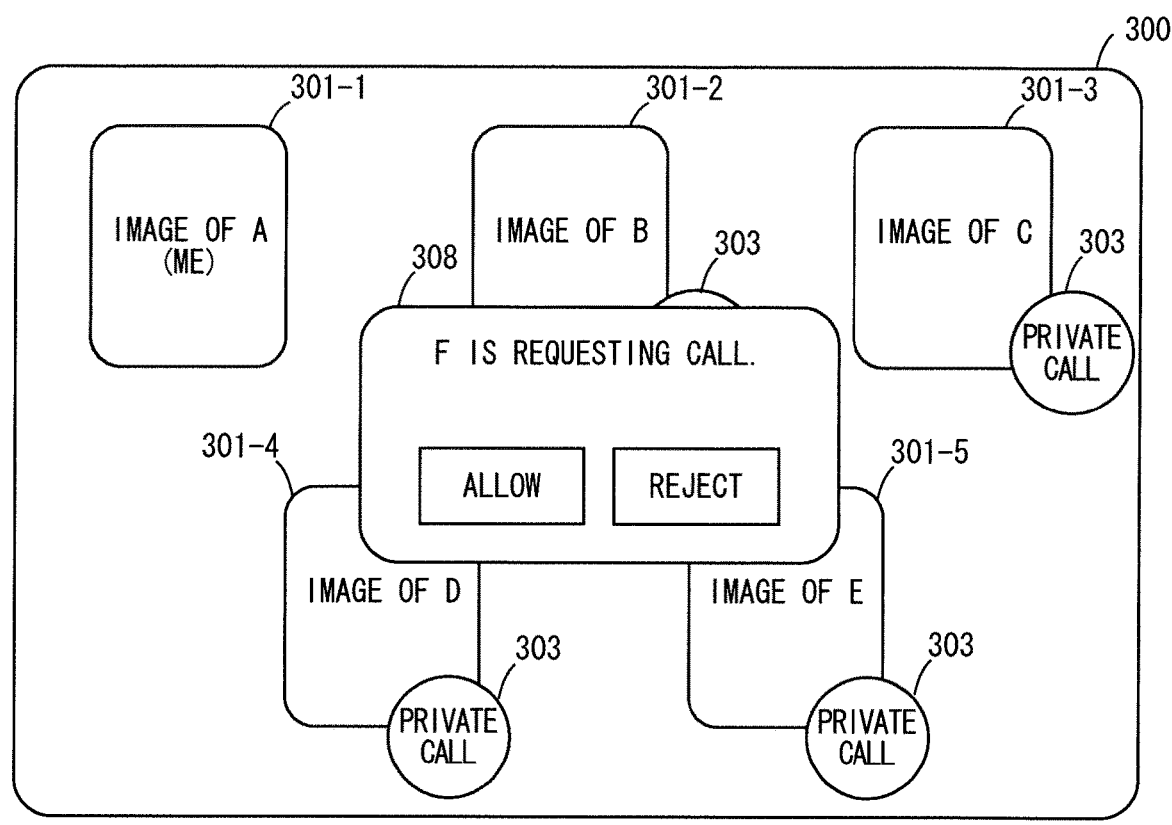
FIG. 15 is a second diagram showing one example of the invitation acceptance screen.

FIG. 15 is a second diagram showing one example of the invitation acceptance screen. Here, in a case in which a call request is made to the user P-1 by the user P-6 who does not belong to the first group, the invitation acceptance screen 308 displayed on the display part 206 of the PC 200-1 is shown.

With reference to FIG. 15, the invitation acceptance screen 308 is a pop-up screen, and is displayed on the display part 206 while being superimposed on the operation screen 300 shown in FIG. 6. The invitation acceptance screen 308 displays the message "F IS REQUESTING CALL," the button in which the characters for "ALLOW" are displayed and the button in which the characters for "REJECT" are displayed. When the user P-4 designates the button in which the characters for "ALLOW" are displayed, the call between the user P-1 and the user P-6 is enabled, and the reproduction mode is switched to the parallel reproduction mode in the PC 200-1. In case of the parallel reproduction mode, in the server 100, the call between the user P-1 and the user P-6 is treated as a call within the second group. In this case, the parallel reproduction screen 310 shown in FIG. 14 is displayed on the display part 206 of the PC 200-1.

When the user P-1 designates the button in which the characters for "REJECT" are displayed, the call between the user P-1 and the user P6 is not realized, and the reproduction mode is maintained in the normal mode and is not switched to the parallel reproduction mode in the PC 200-1.

Figure 16:
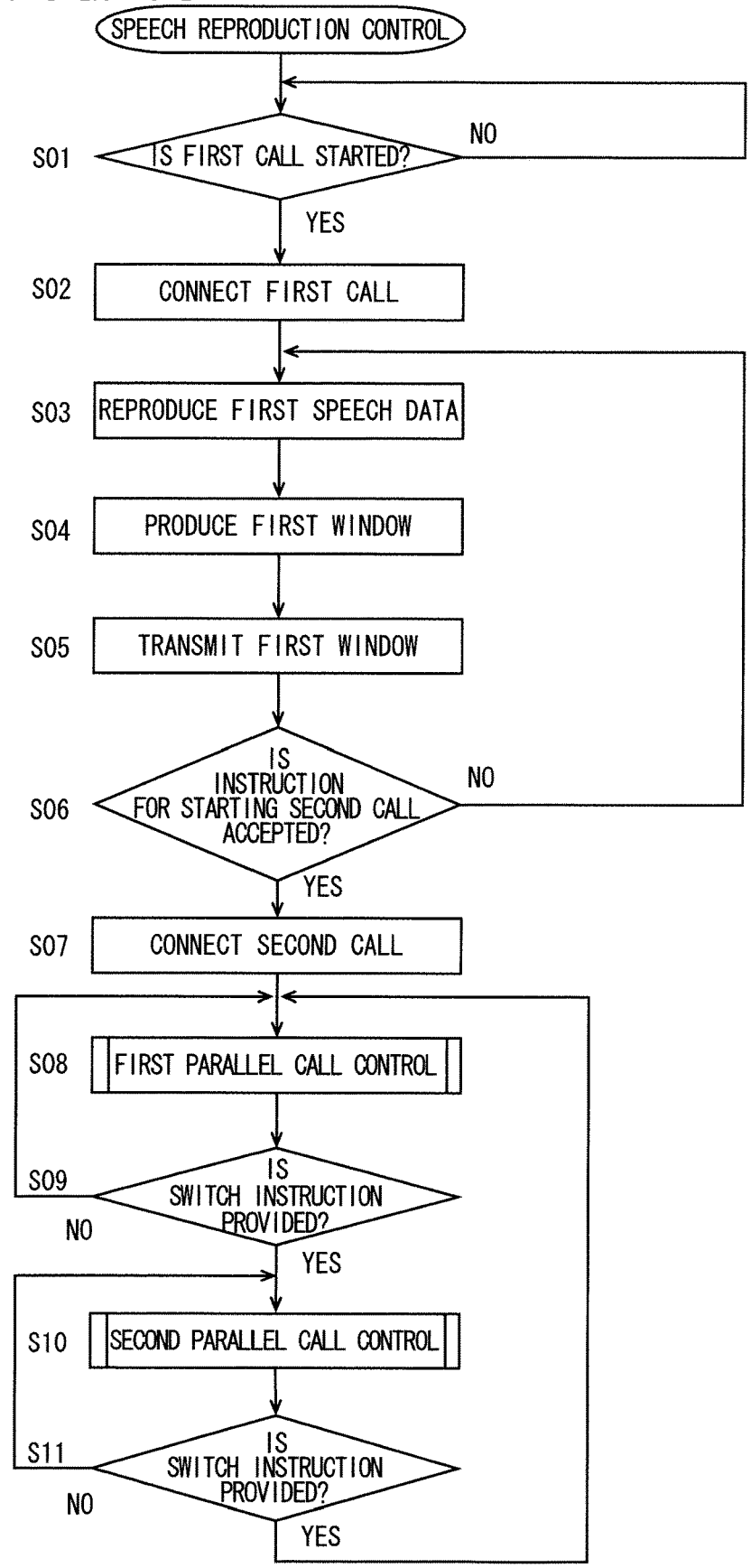
FIG. 16 is a flowchart showing one example of a flow of a speech reproduction control process.

FIG. 16 is a flowchart showing one example of a flow of the speech reproduction control process. The speech reproduction control process is a process executed by the CPU 101 when the CPU 101 included in the server 100 executes the speech reproduction control program stored in the ROM 102, the HDD 104 or the CD-ROM 111. The server 100 controls switching of speech data to be transmitted and received in regard to each of the PCs 200-1 to 200-N. The control for switching the speech data in each of the PCs 200-1 to 200-N is the same. Here, the server 100 controls switching of speech data to be transmitted and received between the server 100 and the PC 200-1, by way of example.

With reference to FIG. 16, the CPU 101 included in the server 100 determines whether a first call has been started. The process waits until the first call is started (NO in the step S01). When the first call is started (YES in the step S01), the process proceeds to the step S02. The first call is a call among the user P-1 and one or more other users. Here, the user P-1 communicate with the other four users P-2 to P-5, by way of example. Further, a set of the users P-1 to P-5 who communicate in the first call constitutes a first group.

In the step S02, the first call is connected, and the process proceeds to the step S03. The users P-1 to P-5 cause the PC 200-1 to PC 200-5 respectively operated by the users P-1 to P-5 to connect to one another and enable transmission and reception of speech data among the PCs 200-1 to 200-5. In addition to speech data, image data can be transmitted and received among the PCs 200-1 to 200-5.

In the step S03, first speech data is reproduced, and the process proceeds to the step S04. The first speech data is the speeches of the other users P-2 to P-5 belonging to the first group. The server 100 transmits the first speech data received from any one of PC 200-2 to 200-5 to the PC 200-1. In the PC 200-1, the first speech received from the server 100 is reproduced, and the speech of the first speech is output from the speaker 209.

In the step S04, a first window is generated, and the process proceeds to the step S05. The first window includes an image relating to the first call. The image relating to the first call include the moving images of the other users P-2 to P-5 picked up by the camera 208, and the image of data shared within the first group. In the step S05, the first window is transmitted to the PC 200-1, and the process proceeds to the step S06. Thus, the first window is displayed on the display part 206 in the PC 200-1. The step S03 and the step S04 are executed at the same time.

In the step S06, whether an instruction for starting a second call is received is determined. In a case in which a user is designated as a party for the second call by the user P-1, or in a case in which the user P-1 is designated as a party for the second call by one of the other users P-2 to P-N, an instruction for starting the second call is accepted. Further, the instruction for starting a second call includes an instruction for inviting the user P-1 to a call within a group other than the first group. If the instruction for starting a second call is accepted, the process proceeds to the step S07. If not, the process returns to the step S03. However, in a case in which it is prohibited to have a second call, even when the instruction for starting a second call is accepted, the process returns to the step S03. In a case in which anyone in the first group having a first call provides an instruction for prohibiting a second call, a second call is prohibited. Here, the user P-1 designates the user P-4 as a party for the second call with a second call not prohibited, by way of example.

In the step S07, the second call is connected, and the process proceeds to the step S08. The PC 200-1 operated by the user P-1 and the PC 200-4 operated by the user P-4 are connected to each other, and transmission and reception of speech data between PCs 200-1, 200-4 is enabled. The server 100 transmits second speech data received from the PC 200-4 to the PC 200-1. In the PC 200-1, the second speech data received from the server 100 is reproduced, and the speech of the second speech data is output from the speaker 209. In addition to speech data, image data can be transmitted and received between the PCs 200-1, 200-4.

In a case in which a user is designated as a party for a second call by the user P-1, when the designated user allows the call, the second call may be connected. Further, in a case in which the user P-1 is designated as a party for a second call by any one of the other users P-2 to P-N, when the user P-1 allows the call, the second call may be connected. Further, in a case in which the user P-1 is invited to a call within a group different from the first group, when the user P-1 allows the call, the second call may be connected.

In the step S08, a first parallel call control process is executed, and the process proceeds to the step S09. The first parallel call control process, which will be described in detail below, is a process of performing control in the PC 200-1 such that the second speech data of the second call is reproduced in speech, and the first speech data of the first call is reproduced in a form different from the reproduction of the second speech data.

In the step S09, whether a switching instruction has been accepted is determined. The switch instruction is an operation input to the PC 200-1 by the user P-1, and is an operation of providing an instruction for switching reproduction form between the first call and the second call. If the switch instruction has been accepted (YES in the step S09), the process proceeds to the step S10. If not, the process returns to the step S08.

In the step S10, a second parallel call control process is executed, and the process proceeds to the step S11. The second parallel call control process, which will be described below in detail, is a process of performing control in the PC 200-1 such that the first speech data of the first call is reproduced in speech and the second speech data of the second call is reproduced in a form different from that in which the first speech data is reproduced.

In the step S11, whether a switch instruction has been accepted is determined. The switch instruction is an operation input to the PC 200-1 by the user P-1, and is an operation of providing an instruction for switching the reproduction mode between the first call and the second call. If the switch instruction is accepted (YES in the step S11), the process returns to the step S08. If not (NO in the step S11), the process returns to the step S10.

At a point in time at which the second call ends, the process returns to the step S02, and the first call is connected. At a point in time at which the first call ends, the second call is connected. In this case, the second call is replaced with the first call, and the process returns to the step S02. At a point in time at which the first call and the second call end, the process ends.

Figure 17:
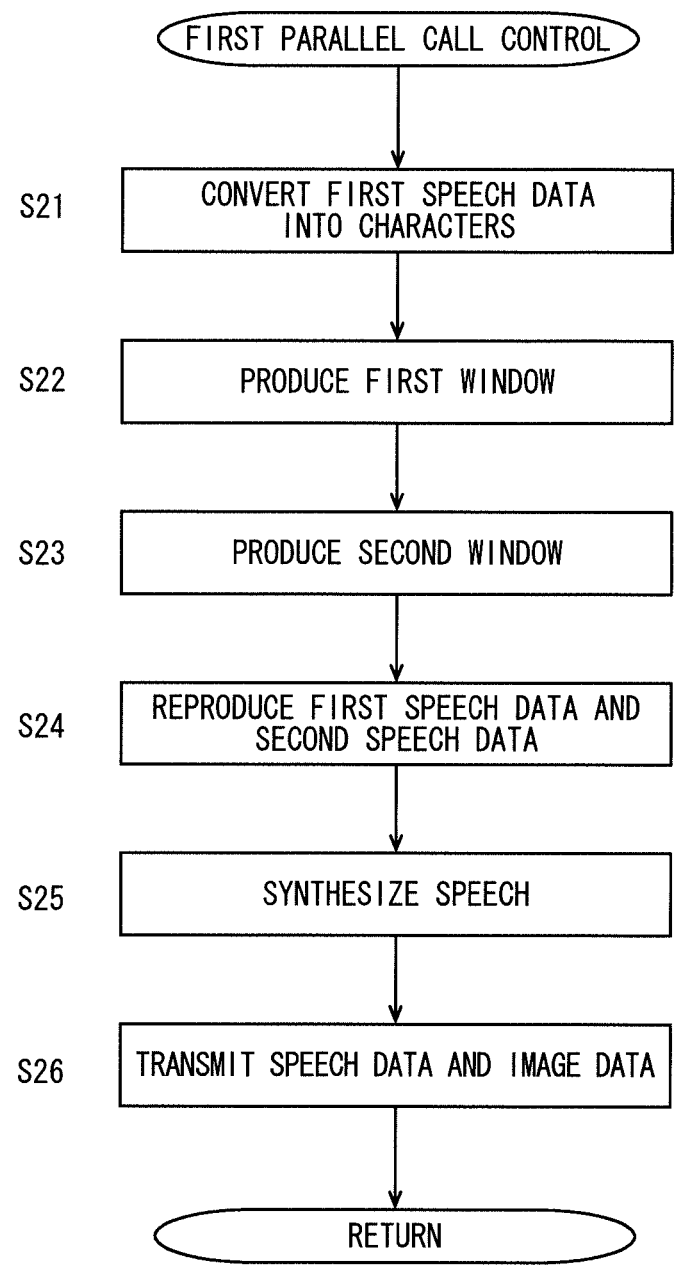
FIG. 17 is a flowchart showing one example of a flow of a first parallel call control process.

FIG. 17 is a flowchart showing one example of a flow of the first parallel call control process. The first parallel call control process is executed in the step S08 of the speech reproduction control process. With reference to FIG. 17, the CPU 101 included in the server 100 converts the first speech data into characters (step S21), and the process proceeds to the step S22. The character information that has been converted from the first speech data into characters may be translated into another language. The character information obtained by conversion of the first speech data into characters includes character information in the same language as that of the first speech data and character information obtained by conversion of the character information into another language. Further, in a case in which the first speech data includes the speeches of a plurality of users, a user who has uttered a speech may be identified based on the speech data, and user identification information for identifying the user who has uttered the speech may be added to the character information corresponding to the speech.

In the step S22, the first window is produced, and the process proceeds to the step S23. The first window includes an image relating to the first call. The first window includes at least an image of the character information produced in the step S21. Further, the image relating to the first call includes the moving images of the other users P-2 to P-5 picked up by the camera 208, and an image of the data shared within the first group, for example.

In the step S23, a second window is produced, and the process proceeds to the step S24. The second window includes the image relating to the second call. The image relating to the second call includes the moving image of the other user P-4 picked up by the camera 208 and the image of data shared within the second group, for example.

In the step S24, the first speech data and the second speech data are reproduced. The first speech data is reproduced in speech, and the second speech data is reproduced in speech. In this case, the volume of speech for reproduction of the first speech data is lower than the volume of speech for reproduction of the second speech data. The second speech data may be reproduced in speech with the first speech data not being reproduced in speech.

In the step S25, the speech obtained when the first speech data is reproduced and the speech obtained when the second speech data is reproduced are synthesized, and the synthesized data is produced. In a case in which the first speech data is not reproduced in speech, the synthesized data includes only the speech of the second speech data. In the next step S26, the speech data and the image data are transmitted to the PC 200-1, and the process returns to the speech reproduction control process. The image data includes the data of the image of the screen including the first window produced in the step S22 and the second window produced in the step S23. The speech data includes the data obtained by compression of the synthesized data produced in the step S25.

Figure 18:
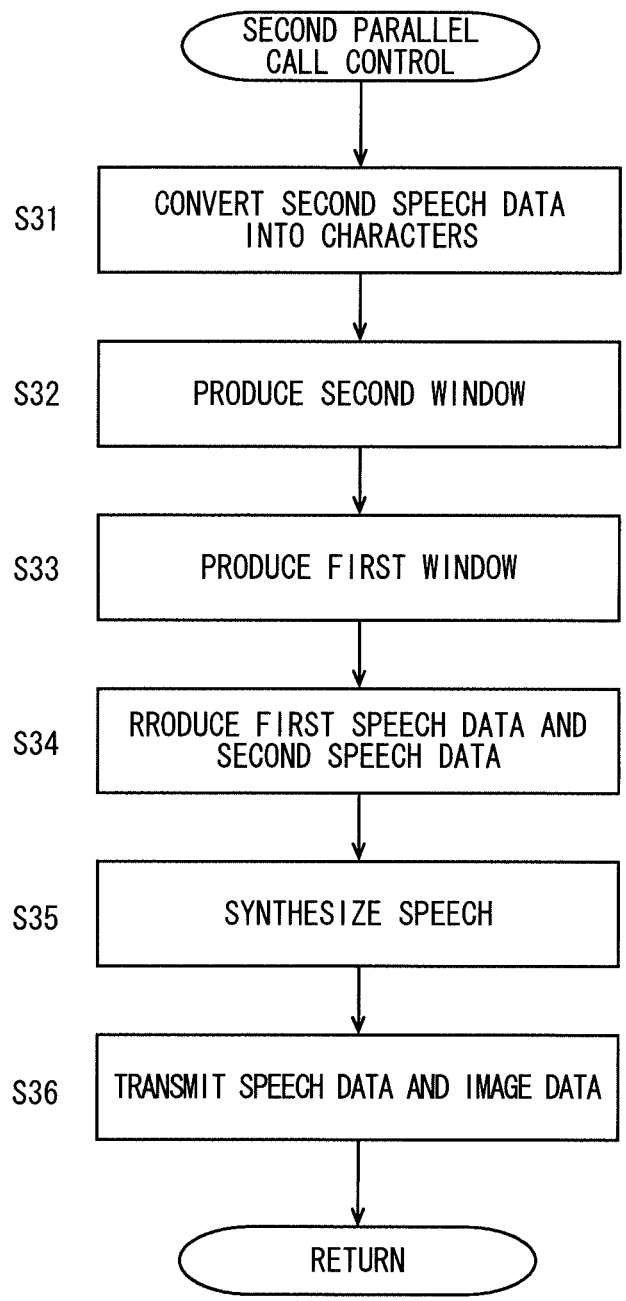
FIG. 18 is a flowchart showing one example of a flow of a second parallel call control process.

FIG. 18 is a flowchart showing one example of a flow of a second parallel call control process. The second parallel call control process is a process executed in the step S10 of the speech reproduction control process. With reference to FIG. 18, the CPU 101 included in the server 100 converts second speech data into characters (step S31), and the process proceeds to the step S32. The character information obtained by conversion of the second speech data into characters may be translated into another language. The character information obtained by conversion of the second speech data into characters includes character information in the same language as that of the second speech data and character information obtained by conversion of the character information into another language. Further, in a case in which the second speech data includes the speeches of a plurality of users, a user who has uttered a speech may be identified based on the speech data, and user identification information for identifying the user who has uttered the speech may be added to the character information corresponding to the speech.

In the step S32, a second window is produced, and the process proceeds to the step S33. The second window includes an image relating to a second call. The second window includes at least an image of the character information produced in the step S31. Further, the image relating to the second call includes a moving image of the other user P-4 picked up by the camera 208 and an image of data shared within the second group, for example.

In the step S33, a first window is produced, and the process proceeds to the step S34. The first window includes an image relating to the first call. The image relating to the first call includes moving images of the other users P-2 to P-5 picked up by the camera 208, and an image of data shared within the first group, for example.

In the step S34, first speech data and second speech data are reproduced. The first speech data is reproduced in speech, and the second speech data is reproduced in speech. In this case, the volume of the speech for reproduction of the second speech data is lower than the volume of the speech for reproduction of the first speech data. The first speech data may be reproduced in speech with the second speech data not reproduced in speech.

In the step S35, the speech obtained by reproduction of the first speech data and the speech obtained by reproduction of the second speech data are synthesized, and synthesized data is produced. In a case in which the second speech data is not reproduced in speech, the synthesized data includes only the speech of the first speech data. In the next step S36, the speech data and the image data are transmitted to the PC 200-1, and the process returns to the speech reproduction control process. The image date includes the data representing a screen including the second window produced in the step S32 and the first window produced in the step S33. The speech data includes data obtained by compression of the synthesized data produced in the step S35.

MODIFICATION EXAMPLE

In the above-mentioned remote conference system 1, the server 100 produces images and speeches to be output by the PCs 200-1 to 200N. In the remote conference system in the modification example, the PCs 200-1 to 200-N include part of the functions of the server 100.

FIG. 19 is a diagram showing one example of the functions of a CPU included in a server according to the modification example. The functions shown in FIG. 19 are implemented by the CPU 101 included in the server 100 when the CPU 101 executes a speech reproduction control program in the modification example stored in a ROM 102, a HDD 104 or a CD-ROM 111. With reference to FIG. 19, differences from the functions shown in FIG. 4 are that parallel reproduction controller 15, the speech reproducer 17 and the character reproducer 19 are removed, and the parallel call controller 13 is changed to a parallel call controller 13A. Therefore, the CPU 101 includes a caller 11 and the parallel call controller 13A.

The parallel call controller 13A executes a call within in a first group and a call within a second group in parallel. In a case in which a specific user belonging to both of the first group and the second group is present, the parallel call controller 13A executes a call within the first group and a call within the second group in parallel for the specific user. The parallel call controller 13A outputs an instruction to the caller 11 such that the speech data of the call within the first group and the speech data of the call within the second group are transmitted to a PC 200 operated by the specific user.

FIG. 20 is a diagram showing one example of the functions of the CPU included in the PC in the modification example. The functions shown in FIG. 20 are implemented by the CPU 201 included in the PC 200 when the CPU 201 executes a terminal-side reproduction program in the modification example stored in a ROM 202, a HDD 204 or a CD-ROM 211A. The terminal-side reproduction control program is part of the speech reproduction control program. With reference to FIG. 20, differences from the functions shown in FIG. 5 are that a parallel reproduction controller 15, a speech reproducer 17 and a character reproducer 19 are added, and the terminal-side caller 251 is changed to a terminal-side caller 251A. The other functions are the same as the functions shown in FIG. 5. A description therefore will not be repeated.

The terminal-side caller 251A controls a call among the user operating the PC 200 and other users. The number of other users is equal to or larger than one. The terminal-side caller 251A enables a call among the user who operates the PC 200 and the other one or more users in a group including the user who operates the PC 200 and one or more users. The terminal-side caller 251A treats respective calls within a plurality of respective groups as separate calls. The terminal-side caller 251A transmits information in regard to a call within the first group to the server 100 and receives information in regard to a call within the first group from the server 100, and transmits information in regard to a call within the second group to the server 100 and receives information in regard to a call within the second group from the server 100.

The terminal-side caller 251A controls a communicator 205 to receive speech data from the server 100. The terminal-side caller 251 outputs the speech data received from the server 100 to a parallel reproduction controller 15. In a case in which image data is received from the server 100, the terminal-side caller 251A outputs the image data to the parallel reproduction controller 15.

The parallel reproduction controller 15 outputs the speech data of a call within the first group and the speech data of a call within the second group to a speech reproducer 17 and a character reproducer 19. The parallel reproduction controller 15 controls the speech reproducer 17 and the character reproducer 19 to reproduce the speech data of a call within the first group and the speech data of a call within the second group in parallel.

The speech reproducer 17 reproduces speech data in speech. The speech reproducer 17 outputs the reproduced speech to a speech output controller 255.

The character reproducer 19 reproduces speech data by converting the speech data into characters. Specifically, the character reproducer 19 converts the speech data into characters by speech recognition. The character reproducer 19 outputs character information including characters into which the speech data has been converted to the display controller 257. The character reproducer 19 may specify a user who is uttering a speech based on the speech data and output character information to which user identification information for identifying the specified user is added to the parallel call controller 13. Further, the character reproducer 19 may translate the character information into which the speech data has been converted into another language, and may output the translated character information to the parallel call controller 13.

The parallel reproduction controller 15 controls the character reproducer 19 and causes the character reproducer 19 to reproduce the first speech data of a call within the first group. In parallel with the reproduction of the first speech data by the character reproducer 19, the parallel reproduction controller 15 controls the speech reproducer 17, causes the speech reproducer 17 to reproduce the second speech data of a call within the second group, and causes the speech reproducer 17 not to reproduce the first speech data or to reproduce the first speech data at a volume lower than that for the second speech data.

The parallel reproduction controller 15 provides an instruction to the terminal-side caller 251A such that the speech data output from the speech input controller 253 is transmitted to the server 100 as the speech data of the second group and not as the speech data of the first group. Thus, although being transmitted to a user in the second group, the speech of the user is not transmitted to a user in the first group.

In response to the start of a call within the second group while a call within the first group is in progress in the caller 11, the parallel reproduction controller 15 executes the call within the first group and the call within the second group in parallel. In response to acceptance of a start instruction indicating the start of a parallel call from a specific user after a call within the second group is started while a call within the first group is in progress in the caller 11, the parallel reproduction controller 15 may execute a call within the first group and a call within the second group in parallel.

Further, in a case in which accepting a switch instruction from a specific user during execution of a call within the first group and a call within the second group in parallel, the parallel reproduction controller 15 may switch between reproduction of the call within the first group and reproduction of the call within the second group. Specifically, in response to acceptance of the switch instruction, the parallel reproduction controller 15 controls the character reproducer 19, causes the character reproducer 19 to reproduce the second speech data, controls the speech reproducer 17, causes the speech reproducer 17 to reproduce the first speech data, and causes the speech reproducer 17 not to reproduce the second speech data or to reproduce the second speech data at a volume lower than that for the first speech data.

It should be understood that the embodiments disclosed herein are illustrative and non-restrictive in every respect. The scope of the present invention is defined not by the above description but by the appended claims, and is intended to include any modifications within the scope and meaning equivalent to the appended claims.

Overview of Embodiments (Item 1) A speech reproduction control system includes a speech reproducer that reproduces speech data in speech, a character reproducer that converts the speech data into characters for reproduction, and a hardware processor that reproduces first speech data and second speech data in parallel, wherein the hardware processor reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

According to this aspect, the second speech data is reproduced in speech, the first speech data is converted into characters to be reproduced, and the first speech data is not reproduced in speech or is reproduced at a volume lower than that for the second speech data. Therefore, the user can confirm the first speech data in characters while confirming the second speech data in speech. Therefore, because a plurality of speeches are output in different forms, the user can distinguish and identify the plurality of speeches. As a result, it is possible to provide the speech reproduction control system capable of reproducing a plurality of speeches in parallel in an identifiable manner.

(Item 2) The speech reproduction control system according to item 1, wherein the hardware processor, in a case in which reproduction of the second speech data is started during reproduction of the first speech data by the speech reproducer, reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

According to this aspect, in a case in which reproduction of the second speech data is started during reproduction of the first speech data, the second speech data is reproduced in speech, the first speech data is converted into the characters to be reproduced, and the first speech data is not reproduced in speech or reproduced at a volume lower than that for the second speech data. Therefore, the second speech data to be reproduced later is given priority over the first speech data for reproduction. Therefore, because the user does not need to designate the speech data to be prioritized, this facilitates an operation.

(Item 3) The speech reproduction control system according to item 2, wherein the hardware processor, in response to start of reproduction of the second speech data during reproduction of the first speech data by the speech reproducer, reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

According to this aspect, in a case in which reproduction of the second speech data is started during reproduction of the first speech data, the second speech data is reproduced in speech, the first speech data is converted into the characters to be reproduced, and the first speech data is not reproduced in speech or reproduced at a volume lower than that for the second speech data. Therefore, because the first speech data and the second speech data are reproduced with the start of the second speech data as a trigger, a switch operation is not necessary. This facilitates the operation.

(Item 4) The speech reproduction control system according to item 2, wherein the hardware processor, in a case in which reproduction of the second speech data is started during reproduction of the first speech data by the speech reproducer, in response to a predetermined instruction provided by a user, reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

According to this aspect, in a case in which reproduction of the second speech data is started during reproduction of the first speech data, in response to a predetermined instruction provided by the user, the second speech data is reproduced in speech, the first speech data is converted into characters to be reproduced, and the first speech data is not reproduced in speech or the first speech data is reproduced at a volume lower than that for the second speech data. Therefore, the user can designate points in time at which a plurality of speeches are output in different forms. This improves convenience.

(Item 5) The speech reproduction control system according to item 1, includes a caller that executes a call among a plurality of users, wherein the hardware processor that executes a first call and a second call in parallel by using the caller, the first speech data is speech data of the first call, and the second speech data is speech data of the second call.

According to this aspect, the second call is reproduced in speech, the first call is converted into characters to be reproduced, and the first call not reproduced in speech or is reproduced at a volume smaller than that for the second call. Therefore, the user can confirm the first call in characters while confirming the second call in speech. Therefore, because a plurality of speeches are output in different forms, the user can distinguish and identify the plurality of speeches. As a result, it is possible to provide the speech reproduction control system capable of reproducing a plurality of calls in parallel in an identifiable manner.

(Item 6) The parallel reproduction control system according to item 5, wherein the hardware processor is capable of displaying a first window including a first image relating to the first call and a second window including a second image relating to the second call.

According to this aspect, the first window including the first image relating to the first call and the second window including the second image relating to the second call are displayed. Therefore, the first image and the second image can be displayed in a distinguishable manner.

(Item 7) The speech reproduction control system according to item 6, wherein the hardware processor displays character information obtained when the first speech data is reproduced by the character reproducer in the first window.

According to this aspect, because the speech and the image relating to the first call are displayed in the first window, it is possible to collectively display the information relating to the first call.

(Item 8) The speech reproduction control system according to item 5, wherein the first call is a call among an operator and one or more first users, and the second call is a call among the operator and one or more second users.

According to this aspect, the user can have a call with the first user and a call with the second user in parallel.

(Item 9) The speech reproduction control system according to item 1, wherein the hardware processor switches from a state in which the hardware processor reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer to a state in which the hardware processor reproduces the second speech data by using the character reproducer, turns off reproduction of the second speech data by the speech reproducer or reproduces the second speech data at a volume lower than a volume for reproduction of the first speech data, and reproduces the first speech data by using the speech reproducer.

According to this aspect, the form in which the first speech data is reproduced is different from the form in which the second speech data is reproduced, and the forms in which the first speech data and the second speech data are reproduced are switched. Therefore, the operator can select one of the first speech data and the second speech data to be prioritized.

(Item 10) The speech reproduction control system according to item 1, wherein the hardware processor prohibits reproduction.

According to this aspect, the second speech data is reproduced in speech, the first speech data is converted into characters to be reproduced, and the first speech is not reproduced in speech or is prohibited from being reproduced at a volume lower than that for the second speech data. Therefore, it is possible to prioritize reproduction of the first speech data.

(Item 11) The speech reproduction control system according to item 8, wherein the second user includes at least one of the one or more first users.

(Item 12) The speech reproduction control system according to item 8, wherein the second user includes at least one of third users other than the one or more first users.

(Item 13) A speech reproduction control method causes a speech reproduction control device to execute a speech reproducing step of reproducing speech data in speech, a character reproducing step of converting the speech data into characters for reproduction, and a parallel reproduction controlling step of reproducing first speech data and second speech data in parallel, wherein the parallel reproduction controlling step includes causing the first speech data to be reproduced in the character reproducing step, causing the first speech data not to be reproduced in the speech reproducing step or to be reproduced at a volume lower than a volume for reproduction of the second speech data, and causing the second speech data to be reproduced in the speech reproducing step.

According to this aspect, it is possible to provide the speech reproduction control method with which a plurality of speeches can be reproduced in parallel in an identifiable state.

(Item 14) A non-transitory computer-readable recording medium is encoded with a speech reproduction control program that causes a computer to execute a speech reproducing step of reproducing speech data in speech, a character reproducing step of converting the speech data into characters for reproduction, and a parallel reproduction controlling step of reproducing first speech data and second speech data in parallel, wherein the parallel reproduction controlling step includes reproducing the first speech data in the character reproducing step, not reproducing the first speech data in the speech reproducing step or reproducing the first speech data at a volume lower than a volume for reproduction of the second speech data, and reproducing the second speech data in the speech reproducing step.

According to this aspect, it is possible to provide the speech reproduction control program capable of reproducing a plurality of speeches in parallel in an identifiable manner.

Although embodiments of the present invention have been described and illustrated in detail, the disclosed embodiments are made for purpose of illustration and example only and not limitation. The scope of the present invention should be interpreted by terms of the appended claims.

What is claimed is:

1. A speech reproduction control system comprising:
    a speech reproducer that reproduces speech data in speech;
    a character reproducer that converts the speech data into characters for reproduction, and
    a hardware processor that reproduces first speech data and second speech data in parallel, wherein
    the hardware processor reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

2. The speech reproduction control system according to claim 1, wherein
    the hardware processor, in a case in which reproduction of the second speech data is started during reproduction of the first speech data by the speech reproducer, reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

3. The speech reproduction control system according to claim 2, wherein
    the hardware processor, in response to start of reproduction of the second speech data during reproduction of the first speech data by the speech reproducer, reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

4. The speech reproduction control system according to claim 2, wherein
    the hardware processor, in a case in which reproduction of the second speech data is started during reproduction of the first speech data by the speech reproducer, in response to a predetermined instruction provided by a user, reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer.

5. The speech reproduction control system according to claim 1, comprising a caller that executes a call among a plurality of users, wherein
    the hardware processor executes a first call and a second call in parallel by using the caller,
    the first speech data is speech data of the first call, and
    the second speech data is speech data of the second call.

6. The parallel reproduction control system according to claim 5, wherein
    the hardware processor is capable of displaying a first window including a first image relating to the first call and a second window including a second image relating to the second call.

7. The speech reproduction control system according to claim 6, wherein
    the hardware processor displays character information obtained when the first speech data is reproduced by the character reproducer in the first window.

8. The speech reproduction control system according to claim 5, wherein
    the first call is a call among an operator and one or more first users, and
    the second call is a call among the operator and one or more second users.

9. The speech reproduction control system according to claim 1, wherein
the hardware processor switches from a state in which the hardware processor reproduces the first speech data by using the character reproducer, turns off reproduction of the first speech data by the speech reproducer or reproduces the first speech data at a volume lower than a volume for reproduction of the second speech data, and reproduces the second speech data by using the speech reproducer to a state in which the hardware processor reproduces the second speech data by using the character reproducer, turns off reproduction of the second speech data by the speech reproducer or reproduces the second speech data at a volume lower than a volume for reproduction of the first speech data, and reproduces the first speech data by using the speech reproducer.

10. The speech reproduction control system according to claim 1, wherein the hardware processor prohibits reproduction.

11. A speech reproduction control method of causing a speech reproduction control device to execute:
a speech reproducing step of reproducing speech data in speech;
a character reproducing step of converting the speech data into characters for reproduction; and
a parallel reproduction controlling step of reproducing first speech data and second speech data in parallel, wherein
the parallel reproduction controlling step includes causing the first speech data to be reproduced in the character reproducing step, causing the first speech data not to be reproduced in the speech reproducing step or to be reproduced at a volume lower than a volume for reproduction of the second speech data, and causing the second speech data to be reproduced in the speech reproducing step.

12. The speech reproduction control method according to claim 11, wherein
the parallel reproduction controlling step includes, in a case in which reproduction of the second speech data is started during reproduction of the first speech data in the speech reproducing step, reproducing the first speech data in the character reproducing step, turning off reproduction of the first speech data in the speech reproducing step or reproducing the first speech data at a volume lower than a volume for reproduction of the second speech data, and reproducing the second speech data in the speech reproducing step.

13. The speech reproduction control method according to claim 12, wherein
the parallel reproduction controlling step includes, in response to start of reproduction of the second speech data during reproduction of the first speech data in the speech reproducing step, reproducing the first speech data in the character reproducing step, turning off reproduction of the first speech data in the speech reproducing step or reproducing the first speech data at a volume lower than a volume for reproduction of the second speech data, and reproducing the second speech data in the speech reproducing step.

14. The speech reproduction control method according to claim 12, wherein
the parallel reproduction controlling step includes, in a case in which reproduction of the second speech data is started during reproduction of the first speech data in the speech reproducing step, in response to a predetermined instruction provided by a user, reproducing the first speech data in the character reproducing step, turning off reproduction of the first speech data in the speech reproducing step or reproducing the first speech data at a volume lower than a volume for reproduction of the second speech data, and reproducing the second speech data in the speech reproducing step.

15. The speech reproduction control method according to claim 11, further including:
a calling step of executing a call among a plurality of users; and
a parallel call controlling step of executing a first call and a second call in parallel in the calling step, wherein
the first speech data is speech data of the first call,
the second speech data is speech data of the second call, and
the parallel call controlling step includes reproducing speech data in the parallel reproduction controlling step.

16. The parallel reproduction control method according to claim 15, further including a display controlling step of being capable of displaying a first window including a first image relating to the first call and a second window including a second image relating to the second call.

17. The speech reproduction control method according to claim 16, wherein
the display controlling step includes displaying character information obtained when the first speech data is reproduced in the character reproducing step in the first window.

18. The speech reproduction control method according to claim 15, wherein
the first call is a call among an operator and one or more first users, and
the second call is a call among the operator and one or more second users.

19. The speech reproduction control method according to claim 11, wherein
the parallel reproduction controlling step includes switching from a state in which the parallel reproduction controller reproduces the first speech data in the character reproducing step, turns off reproduction of the first speech data in the speech reproducing step or reproduces the first speech data at a volume lower than a volume for reproduction of the second speech data, and reproduces the second speech data in the speech reproducing step to a state in which the parallel reproduction controller reproduces the second speech data in the character reproducing step, turns off reproduction of the second speech data in the speech reproducing step or reproduces the second speech data at a volume lower than a volume for reproduction of the first speech data, and reproduces the first speech data in the speech reproducing step.

20. A non-transitory computer-readable recording medium encoded with a speech reproduction control program that causes a computer to execute:
a speech reproducing step of reproducing speech data in speech;
a character reproducing step of converting the speech data into characters for reproduction, and
a parallel reproduction controlling step of reproducing first speech data and second speech data in parallel, wherein
the parallel reproduction controlling step includes reproducing the first speech data in the character reproducing step, not reproducing the first speech data in the speech reproducing step or reproducing the first speech data at a volume lower than a volume for reproduction of the second speech data, and reproducing the second speech data in the speech reproducing step.

\* \* \* \* \*